United States Patent
Moffa

(10) Patent No.: US 10,695,600 B2
(45) Date of Patent: Jun. 30, 2020

(54) MONITORING PLATFORM FOR MECHANICAL FIRE SUPPRESSION SYSTEMS

(71) Applicant: Tyco Fire Products LP, Lansdale, PA (US)

(72) Inventor: Anthony Philip Moffa, Northborough, MA (US)

(73) Assignee: Tyco Fire Products LP, Lansdale, PA (US)

( * ) Notice: Subject to any disclaimer, the term of this patent is extended or adjusted under 35 U.S.C. 154(b) by 198 days.

(21) Appl. No.: 15/382,391

(22) Filed: Dec. 16, 2016

(65) Prior Publication Data

US 2018/0169451 A1    Jun. 21, 2018

(51) Int. Cl.
| | |
|---|---|
| *A62C 37/50* | (2006.01) |
| *A62C 3/00* | (2006.01) |
| *A62C 3/02* | (2006.01) |
| *G06Q 10/00* | (2012.01) |
| *G06Q 30/00* | (2012.01) |
| *G06Q 50/26* | (2012.01) |
| *G06F 3/0482* | (2013.01) |

(52) U.S. Cl.
CPC ............ *A62C 37/50* (2013.01); *G06F 3/0482* (2013.01); *G06Q 10/20* (2013.01); *G06Q 30/018* (2013.01); *G06Q 50/265* (2013.01)

(58) Field of Classification Search
CPC .. A62C 37/50; G06F 3/04842; G06Q 50/265; G06Q 10/20; G06Q 30/018
See application file for complete search history.

(56) References Cited

U.S. PATENT DOCUMENTS

| | | | | |
|---|---|---|---|---|
| 5,931,233 | A * | 8/1999 | La Bonte | A62C 2/08 169/13 |
| 7,934,564 | B1 * | 5/2011 | Stell | A62C 37/36 169/26 |
| 8,622,147 | B1 * | 1/2014 | Williams | G08B 17/10 169/26 |
| 9,399,150 | B1 | 7/2016 | Almutairi | |
| 2002/0088625 | A1 | 7/2002 | Brennan | |
| 2002/0116157 | A1 * | 8/2002 | Markle | H04L 41/0213 702/188 |

(Continued)

OTHER PUBLICATIONS

ABB , Service suite mobile (Year: 2010).*

(Continued)

*Primary Examiner* — Mohammad K Islam
(74) *Attorney, Agent, or Firm* — Foley & Lardner LLP

(57) ABSTRACT

Systems and methods for remote monitoring of mechanical fire suppression systems are provided. For example, some embodiments generally provide for a smart fire suppression system with integrated sensors and communication technology to monitor the current state of the fire suppression system and notify various monitoring platforms, service providers, equipment manufacturers and/or others of the current state. In some embodiments, various sensors (e.g., micro switches) can be used to detect and report the status of the cartridge, activation status of the system, and/or the status of the detection line. Additional sensors and actuators may be also be included within the smart fire suppression system to allow monitoring of different states (e.g., temperature) and control the appliance and/or building utilities.

24 Claims, 14 Drawing Sheets

(56) References Cited

U.S. PATENT DOCUMENTS

| | | | |
|---|---|---|---|
| 2004/0226726 A1* | 11/2004 | Holland | A62C 3/07 169/62 |
| 2005/0110632 A1* | 5/2005 | Berezowski | G08B 17/00 340/521 |
| 2005/0111995 A1 | 5/2005 | Everson | |
| 2005/0183868 A1* | 8/2005 | Taylor | A62C 37/44 169/51 |
| 2005/0273279 A1* | 12/2005 | Faltesek | A62C 99/009 702/51 |
| 2005/0285730 A1* | 12/2005 | Turner | G06Q 10/10 340/514 |
| 2007/0074877 A1 | 4/2007 | Thompson | |
| 2007/0241866 A1 | 10/2007 | Cool et al. | |
| 2007/0241879 A1* | 10/2007 | Jobe | G08B 25/009 340/506 |
| 2008/0103768 A1* | 5/2008 | Berezowski | A62C 37/50 704/233 |
| 2010/0236796 A1* | 9/2010 | Chattaway | A62C 3/08 169/46 |
| 2012/0018177 A1* | 1/2012 | Eckholm | A62C 35/13 169/16 |
| 2012/0168184 A1 | 7/2012 | Enk, Sr. | |
| 2013/0046884 A1 | 2/2013 | Frost et al. | |
| 2013/0106600 A1 | 5/2013 | Hall et al. | |
| 2013/0240222 A1 | 9/2013 | Krueger | |
| 2013/0262170 A1 | 10/2013 | Cordio et al. | |
| 2013/0263657 A1 | 10/2013 | Sides | |
| 2014/0064426 A1* | 3/2014 | Hess | G21C 9/00 376/277 |
| 2014/0331977 A1* | 11/2014 | Smiddy | F02M 13/08 123/525 |
| 2015/0053431 A1* | 2/2015 | Graham | A62C 3/08 169/61 |
| 2015/0136430 A1* | 5/2015 | Livchak | F24C 15/2021 169/46 |
| 2015/0345907 A1* | 12/2015 | Varga | F41G 3/147 89/41.05 |
| 2015/0367157 A1 | 12/2015 | Rohlik et al. | |
| 2016/0096053 A1* | 4/2016 | Beechy | A62C 35/68 169/46 |
| 2016/0101304 A1 | 4/2016 | Langenbeck et al. | |
| 2016/0117646 A1* | 4/2016 | Lerick | G06Q 10/1095 705/7.21 |
| 2016/0121151 A1* | 5/2016 | Schmitt | A62C 35/60 169/46 |
| 2016/0263410 A1 | 9/2016 | Enk, Sr. | |
| 2016/0313170 A1 | 10/2016 | Cameron | |
| 2016/0349097 A1 | 12/2016 | Crouse | |
| 2016/0381440 A1 | 12/2016 | Davis | |
| 2017/0030528 A1 | 2/2017 | Dietzen et al. | |
| 2017/0206776 A1* | 7/2017 | Linder | G08B 1/08 |
| 2017/0216646 A1 | 8/2017 | Casamento | |
| 2017/0233243 A1 | 8/2017 | McNicholas | |
| 2017/0251021 A1 | 8/2017 | Trani | |
| 2018/0114430 A1 | 4/2018 | Westmacott et al. | |
| 2018/0161610 A1 | 6/2018 | Kjellman | |
| 2018/0204441 A1* | 7/2018 | Zribi | G08B 1/08 |

OTHER PUBLICATIONS

Warren et al., Technical Report RD-GC-86-16: Vibration of Pressurized Cylinders, U.S. Army Missile Command, Jan. 1988, 11 pages.

* cited by examiner

MONITORING PLATFORM FOR MECHANICAL FIRE SUPPRESSION SYSTEMS

TECHNICAL FIELD

Various embodiments of the present technology generally relate to fire suppression systems. More specifically, the embodiments of the present technology relate to remote monitoring of mechanical fire suppression systems.

BACKGROUND

Mechanical fire suppression systems are pervasive in restaurants and have been used to protect kitchen and cooking appliances from the threat of a fire. Typically, these mechanical fire suppression systems work on a simple principle: a tensioned cable and a group of mechanical fuses are installed in the hood above the cooking surfaces and are connected to a trigger mechanism outside the hood area. The mechanical fuses are unaffected by normal operating temperatures or low heat levels. However, when enough heat is generated by a fire, any fuse exposed to the excessive heat breaks and releases tension on the cable thereby activating the trigger mechanism. The activation of the trigger mechanism causes a cascading series of events, including the activation of a pressurized cartridge, the dispersion of a chemical suppression agent on the cooking surfaces, shut-down of the gas or electricity powering the cooking appliances, changes in air handling equipment, and potentially the activation of visual and audible alarms.

Due to the mechanical nature of these traditional fire suppression systems, there are some very rigorous inspection and maintenance requirements that must be routinely performed. One of the primary reasons for these regular inspection and maintenance requirements is that these systems are often exposed to a large amount of grease and oil, which can build up and detrimentally affect the operation of the fire suppression system. As a result, failure to maintain the system properly will most likely lead to issues, such as a false discharge (mechanical fuses eventually fail due to the excessive number of hot and cold cycles they are put through), or no discharge as the fuses or other parts of the cable are encased in hardened grease. Consequently, these systems need to be cleaned, inspected, and serviced regularly (e.g., on a three to six month cycle, depending on the environment).

While regular inspection and maintenance is essential for proper operation of the fire suppression systems, there are many pitfalls in the maintenance regime that could result in improper operation of the fire suppression system. For example, as part of the maintenance of a hood, technicians typically disable the detection line and remove pressurized cartridges to allow the technician to properly inspect and work on the system with no chance of a false discharge. Unfortunately, the cartridge may not be reinstalled, the detection line may not be put back on line, or both. Left in any one of these states, the fire suppression system provides no suppression protection and is useless.

SUMMARY

Various embodiments of the present technology generally relate to smart fire suppression systems with various sensors and communications modules for determining and reporting information about the state of the fire suppression systems. Some embodiments include a remote monitoring platform that can collect and aggregate data from multiple fire suppression systems.

In some embodiments, a fire suppression system (e.g., for an appliance, vehicle, or other target) can include one or more nozzles, cartridges, agent tanks, distribution piping, release assemblies, sensors and/or communication modules. The nozzles may be placed in a fixed position (e.g., relative to an appliance, wheel well, storage compartment, passenger compartment, etc.). The cartridge may contain a pressurized gas and be coupled to an agent tank having a fire suppression agent stored within. The distribution piping can provide a conduit that allows the fire suppression agent, when expelled from the agent tank, to flow from the agent tank to the nozzle. The nozzle can be associated with (e.g., integrated or attached) one or more temperature sensors to measure a temperature at or near the nozzle.

The release assembly can be coupled to the cartridge. Upon activation of the release assembly, the cartridge releases the pressurized gas causing the fire suppression agent to expel from the agent tank through the distribution piping to the nozzle. The one or more sensors can measure a current state of the nozzle, the cartridge, the agent tank, the release assembly or other system component. Some embodiments of the fire suppression system may have pressurized agent tanks. Accordingly, various embodiments can monitor the pressurized tank without monitoring or alarming on the cartridge (e.g., just the mechanical fuse).

The communications module can receive measurements of the current state from the one or more sensors (e.g., temperature sensors, accelerometers, etc.) and transmit the current state to a remote monitoring platform. In some embodiments, the communications modules can receive a bypass signal to suppress an alarm within the fire suppression system allowing a technician to service the fire suppression system. In response to the bypass signal, the system can enter a maintenance mode where alarm notifications generated by the alarm during a period of time can be suppressed. After the period of time passes, the system can revert to an active monitoring mode where the alarms will not be bypassed thereby preventing the technician from accidently leaving the system in an in operative state.

The alarm notifications can include internal and/or external alarm signals, and the communications module can be further configured to receive an activation signal to active the alarm and accordingly remove the suppression of the alarm notifications. In accordance with various embodiments, the communications module can be further configured to determine whether the one or more sensors indicate that the fire suppression system is fully functional and generate, upon determining that the fire suppression system is not fully functional, an alert to the technician that the period of time the alarm notifications will be suppressed is about to expire.

The communications module can use a short-range network to communicate the measurements of the current state from the one or more sensors. The fire suppression system may also include a gateway to receive, using the short-range network, communications from the communications module and transmit using a cellular or IP-based network the current state to the remote monitoring platform. In some embodiments, the fire suppression system may also include a local memory to record the current state from the one or more sensors over a period of time. The communications module can be configured to transmit the current state over the period of time in batches.

The release assembly can be coupled to a detection line, and the one or more sensors include multiple micro switches. For example, a first micro switch can be configured to determine whether the cartridge is installed. A second micro switch associated with the release assembly can be configured to identify whether the release assembly is loaded or unloaded. A spring-based mechanism can be used in some embodiments to measure the weight of the agent tank. The weight measurement can provide an indication as to whether sufficient fire suppression agent is present within the agent tank.

Some embodiments can include an application running on a computing device. The application may include a graphical user interface generation module and/or a suppression module. The graphical user interface generation module can generate a graphical user interface allowing a first user of the application to view the current state from the one or more sensors. The suppression module can be used to generate signals that, when received by the communications module, suppress alarm notifications during a period of time.

Some embodiments provide for a method comprising receiving, from one or more sensors within a fire suppression system, signals indicative of states of components of the fire suppression system. Based on the signals indicative of the states of the components of the fire suppression system, an operational status of the fire suppression system can be determined. Then, the operational status of the fire suppression system can be transmitted to a monitoring platform via a network connection. The components of the fire suppression system, in some embodiments, can include a cartridge, a detection line, and an agent tank. In those embodiments, determining the operational status of the fire suppression system can include: (1) determining, based on the signals from the one or more sensors (e.g., micro switches), whether the cartridge is installed in the fire suppression system, whether the detection line is properly set, and (2) whether the agent tank includes fire suppression agent (e.g., via a spring-based trigger to measure the weight of the agent tank, a frequency analysis, or some other method).

The operational status may include a functional status indicating that the fire suppression system will operate as expected, a maintenance status indicating that the fire suppression system is under maintenance, a discharge status indicating that the fire suppression system has been discharged, and an inoperative status indicating that the fire suppression system will not operate as expected. The maintenance status includes a set period of time where alarms generated by the fire suppression system will be suppressed.

Embodiments of the present invention also include computer-readable storage media containing sets of instructions to cause one or more processors to perform the methods, variations of the methods, and other operations described herein.

Some embodiments include a monitoring platform comprising a processor, a database, an identification module, a graphical user interface generation module, an analytics engine, a prediction module, a technician locator, a service request module, and/or other components. The database can be used to store multiple fire suppression profiles. Each of the fire suppression profiles can include a variety of information, such as, but not limited to, a location of a fire suppression system, a list of components of the fire suppression system, and a list of sensors available on the fire suppression system. The identification module can be configured to receive sensor data generated by the fire suppression system. Once the sensor data is received, the identification module can identify, based on the sensor data, an operational status of the fire suppression system. The operational status can then be recorded within one of the fire suppression profiles in the database. In accordance with various embodiments, the operational status can include a functional status indicating that the fire suppression system will operate as expected, a maintenance status indicating that the fire suppression system is under maintenance, a discharge status indicating that the fire suppression system has been discharged, and/or an inoperative status indicating that the fire suppression system will not operate as expected.

The graphical user interface generation module can be configured to retrieve, from the database, the operational status from the multiple fire suppression profiles. Once the operational status has been retrieved, a graphical user interface can be generated (or updated) that allows a user to see the operational status of any of the fire suppression profiles. The analytics engine can analyze the sensor data and generate a correlation model that is predictive of when a discharge of the fire suppression system is likely. The prediction module can be configured to process the sensor data in real-time (or near real-time) against the correlation model generated by the analytics engine and generate an inspection request upon determination that the discharge of the fire suppression system is likely. In some embodiments, the prediction module can be configured to process the sensor data in real-time against the correlation model generated by the analytics engine and send a signal to the fire suppression system to automatically cut off a gas line.

The technician locator can be configured to receive location and schedule updates from mobile devices associated with technicians. The service request module can be configured to identify when the operational status of the fire suppression system is inoperative, and to identify an available technician using the technician locator.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings in which.

Figure 1:
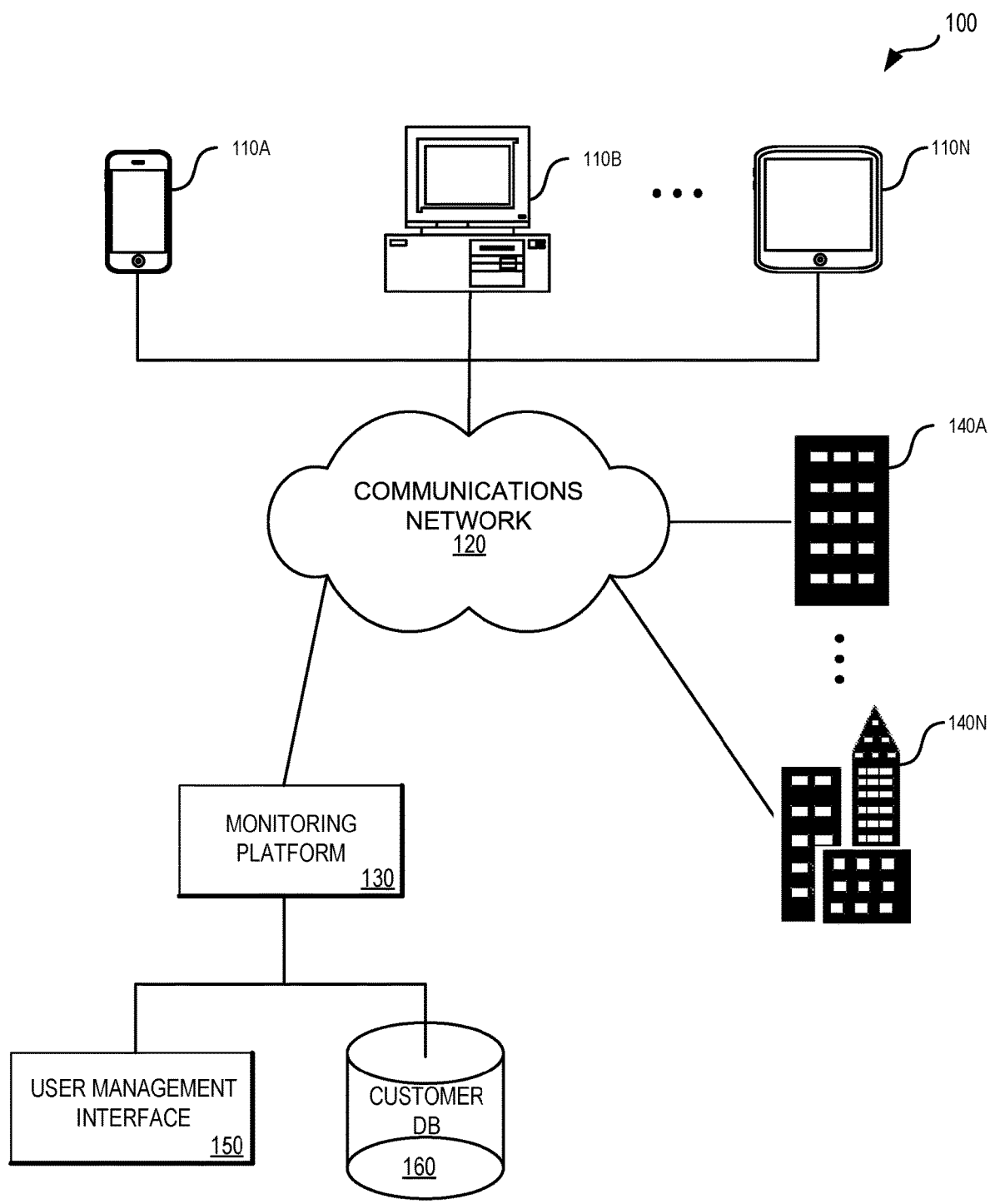
FIG. 1 illustrates an example of an operating environment in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to fire suppression systems. More specifically, some embodiments relate to remote monitoring of mechanical fire suppression systems. Mechanical fire suppression systems are pervasive in a variety of businesses, from restaurants to hotels. Due to the mechanical nature of these systems, there are some very rigorous inspection and maintenance requirements that must be routinely performed. As part of the inspection and maintenance requirements, for example, technicians typically disable a detection line and remove pressurized cartridges to allow for inspection and work to be performed safely on the system. Unfortunately, the technician may forget to reinstall the cartridge, enable the detection line, or both. As a result, the fire suppression system may not perform as desired.

In contrast, various embodiments of the present technology generally provide for a smart fire suppression system with integrated sensors and communication technology that can be used to monitor the current state of the fire suppression system and notify various monitoring platforms, service providers, equipment manufacturers and/or others of the current state. In some embodiments, various sensors (e.g., micro switches) can be used to detect and report the status of the cartridge. In addition, some embodiments of the system can also monitor and report the activation status of the system and/or the status of the detection line using existing micro switches, tension on the line, or the position of the mechanical components on the line.

Some embodiments of the present technology can track maintenance to help ensure maintenance is being performed on a desired schedule. In addition, some embodiments help ensure the system is put back into an operational status after a scheduled maintenance. In various embodiments, the technology can also be used to notify service providers and equipment manufacturers when the fire suppression systems have activated.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to mechanical fire suppression systems for kitchens, embodiments of the present technology are equally applicable to various other types of fire suppression systems and fire suppression systems that may be used in other applications (e.g., in vehicular hazard areas, in computer rooms).

The techniques introduced here can be embodied as special-purpose hardware (e.g., circuitry), as programmable circuitry appropriately programmed with software and/or firmware, or as a combination of special-purpose and programmable circuitry or hardware. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of operating environment 100 in which some embodiments of the present technology may be utilized. As illustrated in FIG. 1, operating environment 100 may include one or more mobile devices 110A-110N (e.g., a mobile phone, tablet computer, mobile media device, mobile gaming device, vehicle-based computer, wearable computing device, etc.), communications network 120, monitoring platform 130 (e.g., running on one or more remote servers), fire suppression systems located in buildings 140A-140N, user management interface 150, and a customer database 160.

Mobile devices 110A-110N and the fire suppression systems located in buildings 140A-140N can include network communication components that enable communication with remote servers (e.g., hosting monitoring platform 130) or other portable electronic devices by transmitting and receiving wireless signals using licensed, semi-licensed or unlicensed spectrum over communications network 120. In some cases, communications network 120 may comprise multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Communications network 120 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Those skilled in the art will appreciate that various other components (not shown) may be included in mobile devices 110A-110N to enable network communication. For example, a mobile device may be configured to communicate over a GSM mobile telecommunications network. As a result, the mobile device or components of the fire suppression systems may include a Subscriber Identity Module (SIM) card that stores an International Mobile Subscriber Identity (IMSI) number that is used to identify the mobile device on the GSM mobile communications network or other networks, for example, those employing 3G and/or 4G wireless protocols. If the mobile device or components of the fire suppression systems is configured to communicate over another communications network, the mobile device or components of the fire suppression systems may include other components that enable it to be identified on the other communications networks.

In some embodiments, mobile devices 110A-110N or components of the fire suppression systems in buildings 140A-140N may include components that enable them to connect to a communications network using Generic Access Network (GAN) or Unlicensed Mobile Access (UMA) standards and protocols. For example, a mobile device may include components that support Internet Protocol (IP)-based communication over a Wireless Local Area Network (WLAN) and components that enable communication with the telecommunications network over the IP-based WLAN. Mobile devices 110A-110N or components of the fire suppression systems may include one or more mobile applications that need to transfer data or check-in with monitoring platform 130.

In some embodiments, monitoring platform 130 can be configured to receive signals regarding the state of one or more fire suppressions systems. The signals can indicate the current status of a variety of system components. For example, in accordance with some embodiments, the signals can indicate whether or not the cartridge is installed, service state of the detection line, activation of the system, sensor measurements (e.g., temperature, accelerations, etc.), and the like. In some embodiments, the fire suppression systems can monitor and report the status of the cartridge using either existing micro switches or the physical position of the cartridge. The status of the detection line can be monitored and reported using existing micro switches, tension on the line, or the position of the mechanical components on the line.

Monitoring platform 130 can provide a centralized reporting platform for companies having multiple properties with fire suppression systems. For example, a hotel chain or restaurant chain may desire to monitor multiple properties via monitoring platform 130. This information can be stored in a database in one or more fire suppression profiles. Each of the fire suppression profiles can include a location of a fire suppression system, a fire suppression system identifier, a list of components of the fire suppression system, a list of sensors available on the fire suppression system, current and historical state information, contact information (e.g., phone numbers, mailing addresses, etc.), maintenance logs, and other information. By recording the maintenance logs, for example, monitoring platform 130 can create certifiable maintenance records to third parties (e.g., insurance companies, fire marshals, etc.) which can be stored in customer database 160.

In some embodiments, the system identifier may be associated with some of the static information. For example, a first set of alphanumeric characters may represent the owner or business (e.g., a particular hotel chain), a second set of alphanumeric characters may represent a particular system configuration, and the like. The following table illustrates some fire suppression profiles that may be recorded on the database.

| System Identifier | Current State | Maintenance Log |
|---|---|---|
| H17836007245 | Active | May 1, 2016 - Full Service |
| | | Nov. 12, 2015 - Full Service |
| | | May 16, 2015 - Full Service |
| | | Dec. 5, 2015 - System Installed |
| H231459A73nq | Detection Line Not Set | Apr. 10, 2016 - Full Service |
| | | Oct. 12, 2015 - Full Service |
| | | May 1, 2015 - System Installed |
| A89438777T91 | Under Maintenance | Mar. 1, 2016 - Replaced thermocouple |
| | | Feb. 12, 2016 - Full Service |
| | | Aug. 22, 2015 - System Installed |

Figure 2:
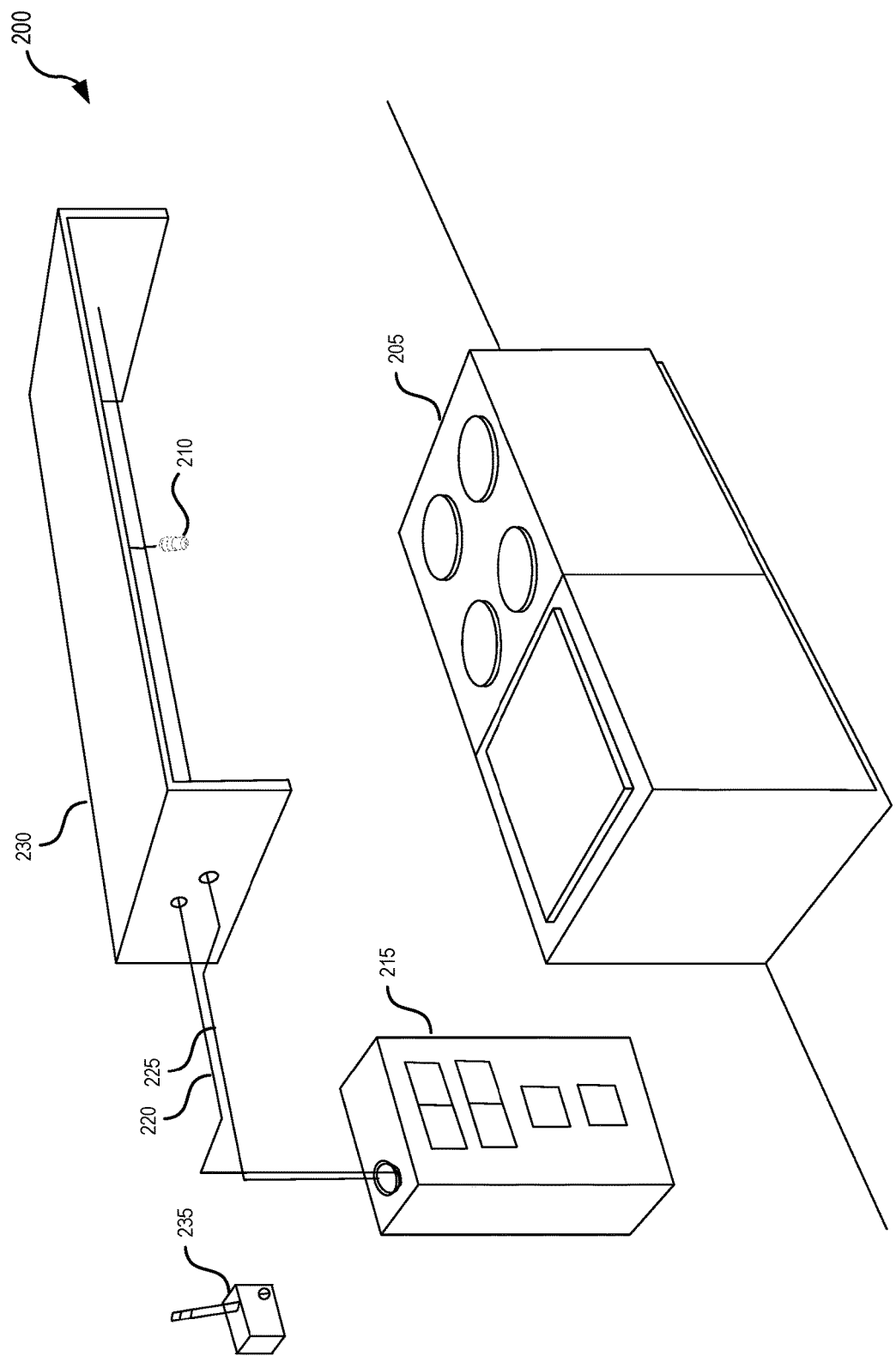
FIG. 2 illustrates a kitchen fire suppression system that may be used in accordance with one or more embodiments of the present technology.

FIG. 2 illustrates a kitchen fire suppression system 200 that may be used in accordance with one or more embodiments of the present technology. As illustrated in FIG. 2, a fire suppression system 200 may be installed for appliance 205 (e.g., stove or other kitchen appliance). Fire suppression system 200 can include nozzle 210 in a fixed position relative to appliance 205. Additional components of the fire suppression system (described in more detail in FIG. 3) can be included in enclosure 215. For example, enclosure 215 can include a cartridge containing a pressurized gas and an agent tank coupled to the cartridge. The pressurized gas within the cartridge may include, for example, Nitrogen or $CO_2$, depending on the application. The agent tank can have a fire suppression agent stored within. The suppression agent is typically housed at atmospheric pressure in the agent tank. The agent tank can be connected to distribution piping 220 providing a conduit that allows the fire suppression agent, when expelled from the agent tank, to flow from the agent tank to the nozzle.

A release assembly inside enclosure 215 can be coupled to the cartridge and detection line 225. Detection line 225 can extend through hood 230 and may be enclosed. Detection line 225 can be designed to break or melt after reaching a temperature that may be indicative of a fire. As detection line 225 breaks, the release assembly is activated. Upon activation of the release assembly, the cartridge within enclosure 215 releases pressurized gas causing the fire suppression agent to expel from the agent tank through the distribution piping 220 to nozzle 210.

In accordance with various embodiments, one or more sensors and at least one communications module can be included within fire suppression system 200. The sensors can be used to measure a current state at the nozzle 210, the cartridge, the agent tank, the release assembly, or other component states (e.g., temperatures, pressures, flow rates, volumes, and the like).

Local processing unit or communications module 235 can be configured to receive measurements of the current state from the one or more sensors and transmit the current state to a remote monitoring platform. In some embodiments, local processing unit or communications module 235 can be configured to receive a bypass signal to suppress an alarm within the fire suppression system. The suppression of the alarm can allow a technician to service the fire suppression system without an alarm signal being generated and/or transmitted, and may also provide positive input that the system is being serviced.

In response to the bypass signal, alarm notifications generated by the alarm can be suppressed for a period of time (e.g., thirty minutes, one hour, two hours etc.). In some embodiments, the bypass signal can include the period of time (e.g., as selected by a technician). In other embodiments, the period of time may be fixed (e.g., five minutes, ten, minutes, one hour, etc.). The alarm notifications can include internal and external alarm signals, and the communications module can be further configured to receive an activation signal to active the alarm. In response to the activation signal, the bypass of the alarm notifications can be removed.

Local processing unit or communications module 235 can be further configured to determine whether the one or more sensors indicate that the fire suppression system is fully functional. Upon determining that the fire suppression system is not fully functional, the fire suppression system can generate an alert to the technician that the period of time the alarm notifications will be suppressed is about to expire. These alarm notifications can be sent via local processing unit or communications module 235 (e.g., using a short-range network or communications protocol). In some embodiments, local processing unit or communications module 235 can directly communicate the measurements of the current state of the one or more sensors to a gateway (not shown). The gateway, upon receiving the signals, can then transmit (e.g., using a cellular or IP-based network) the current state to a remote monitoring platform.

In some embodiments, the fire suppression system can include a local memory to record the current state from the one or more sensors over a period of time. Then, local processing unit or communications module 235 can transmit the current state over the period of time in batches to the monitoring platform. These transmissions may be prescheduled (e.g., every ten minutes, every hour, once a day, etc.) or event triggered. As one example, the system may send more frequent transmission upon determining that the appliance is in use (e.g., based on temperature readings) and then send less frequent transmissions when the applicant is determined not to be in use (e.g., in the middle of the night).

While FIG. 2 illustrates embodiments of the fire suppression system with respect to kitchen appliances, other embodiments of the present technology may be use other types of fire suppression systems. For example, the system can be used for the continuous monitoring and protection of one or more hazard areas of a vehicle. A hazard area can be an engine compartment, a wheel well, a hydraulic system, a storage area for combustible materials, and/or other location of a vehicle. These systems may use a variety of different fire suppressing agents, such as, but not limited to heptafluoropropane and/or sodium bicarbonate. Some embodiments may include multiple zones of protection each having different nozzles and sensors that allow for fire protection and/or prediction. Each of the zones may have a local processing unit or communications module (e.g., communication module 235) can transmit the current state over the period of time in batches to the monitoring platform or to a centralized processing unit that is responsible for the vehicle. Each of the nozzles can be connected via distribution piping to an agent tank and/or pressurized canister to allow for the distribution of the agent.

Figure 3:
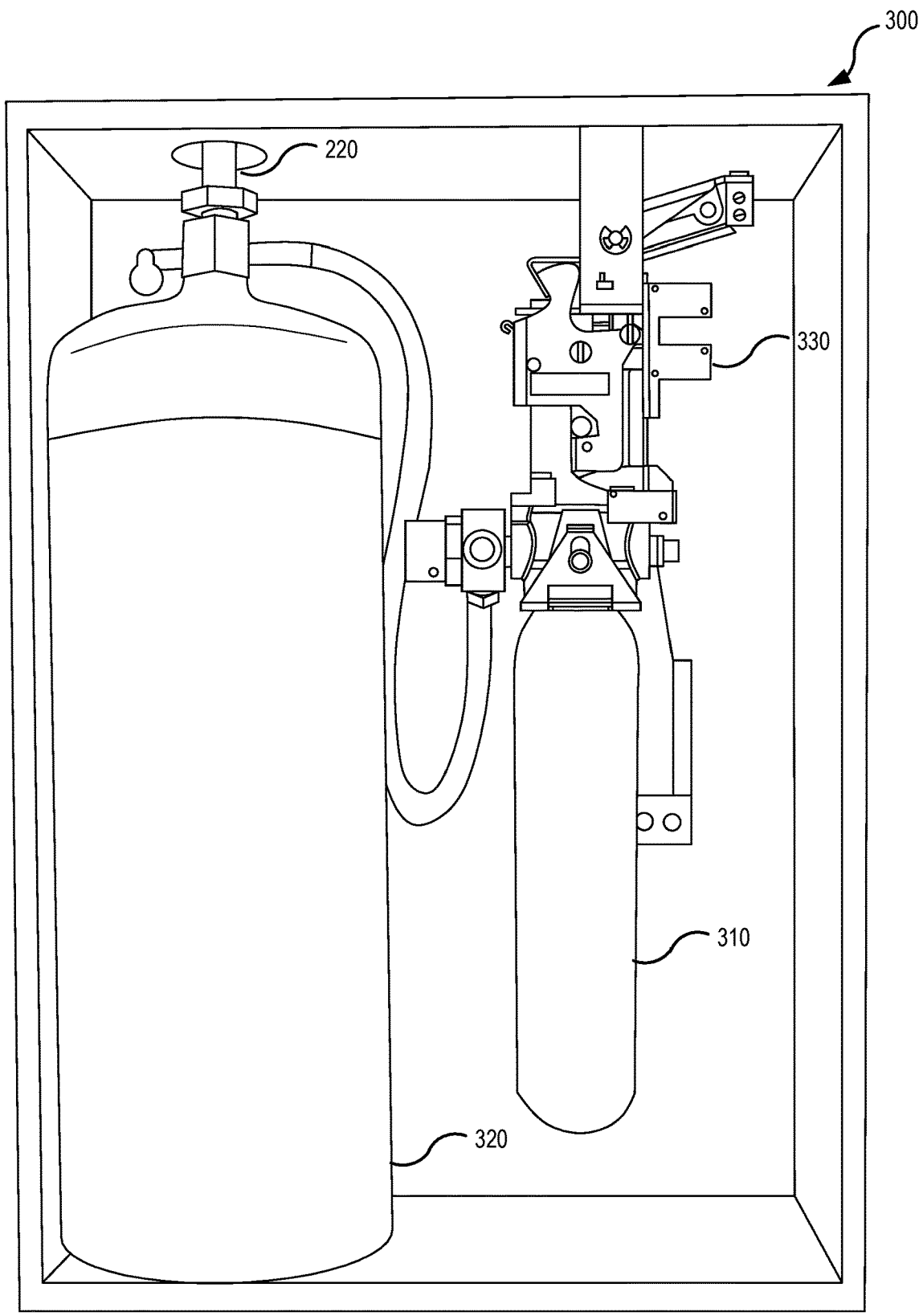
FIG. 3 illustrates a set of components of a fire suppression system that may be used in accordance with various embodiments of the present technology.

FIG. 3 illustrates a set of components 300 of a fire suppression system that may be used in accordance with various embodiments of the present technology. As illustrated in FIG. 3, the components of the fire suppression system within enclosure 215 can include cartridge 310 containing a pressurized gas (e.g., Nitrogen or $CO_2$), agent tank 320 coupled to cartridge 310, and release assembly 330 coupled to the cartridge 310 and detection line 225 (shown in FIG. 2). Agent tank 320 can have stored within it a fire suppression agent. Agent tank 320 can be connected to distribution piping 220 providing a conduit that allows the fire suppression agent, when expelled from the agent tank 320, to flow from agent tank 320 to nozzle 210 via the distribution piping 220.

Release assembly 330 can include one or more sensors (e.g., switches, accelerometers, scales, spring-based mechanism, etc.) to determine whether the cartridge is installed and to identify whether release assembly 330 is loaded or unloaded. These sensors can be provided by a number of manufacturers and can be integrated into various points on the assembly or included as part of an aftermarket add-on kit. When these sensors (e.g., micro switches) are available, the system can monitor the outputs of these sensors as I/O points allowing the system to determine whether cartridge 310 is installed and whether release assembly 330 is loaded or unloaded. For example, in some embodiments, different logic can be provided, depending on whether the switches are normally open or normally closed.

Some embodiments may not include switches (e.g., micro switches). However, other detection mechanisms can be used. For example, cartridge 310 can be tethered and monitored for connectivity as well as a vertical state. Some embodiments can use a counterweighted or liquid metal switch mechanism. Still yet, other embodiments could use accelerometers, gyros, or a ball switch. By affixing a sensor that can detect orientation (e.g., a ball switch) to the cartridge, the system can monitor the cartridge orientation. While in a vertical state (e.g., normal installed position), the switch can be installed/configured to be normally closed, but when removed and placed horizontally (they are cylinders with rounded bottoms so they are generally placed horizontally), it reports a normally open state.

Since maintenance is a regular occurrence, some embodiments may not create an alarm immediately when cartridge 310 is removed. As such, the system can be programmable to add a delay (e.g., one minutes, two minutes, five minutes, ten minutes, twenty minutes, or other amount of time) after which point the system may activate local visual or audible reminder (e.g., using a piezo, buzzer, LED, etc.) to remind a technician that cartridge 310 is still uninstalled.

A spring-based mechanism can be used in some embodiments to measure the weight of agent tank 320. This measurement can be indicative of whether sufficient fire suppression agent is present within agent tank 320. In addition, nozzle 210 can be associated with a temperature sensor to measure a temperature at nozzle 210.

When the fire suppression system is in an operating state, detection line 225 should have tension. During service, the tension on detection line 225 is often released and could be left in the maintenance state afterwards thus leaving the system inoperable. Embodiments of the present technology can monitor the tension on detection line 225 in a variety of ways. For example, a liquid metal or metal ball switch may be used in some embodiments. The liquid metal or metal ball switch can be affixed to an arming mechanism or part of the mechanical armature. The switch would be wired into the system as either a normally open or normally closed switch.

Some embodiments may use a proximity probe or micro switch to determine whether detection line 225 is active. Again, the proximity probe or micro switch may be affixed to the arming mechanism (micro switch) or at the loaded or unloaded position (proximity). The option for a normally open or normally closed switch would be necessary so that multiple system configurations could be monitored. Still yet, some embodiments may use an extensometer or load cell to look at stretch or tension in the cable. In cases where springs are providing the tension on the line, the extensometer could be integrated into the spring (e.g., much like a spring-based scale that fishermen use to weigh the fish they catch). In accordance with various embodiments, the detection line state can be monitored and reported by the microprocessor. Just like the installed state of the cartridge, an alarm could be set locally on a time delay.

Some embodiments can also verify whether a sufficient amount of agent is contained in cartridge 310. For example, when cartridge 310 has a tare weight that is significantly less than the weight when full with agent (e.g., less than 60%, 50%, 40%, etc.) an identification may be made that the agent is missing. In a 1.5-gallon tank, approximately 12.5 pounds of agent is typically needed to fill agent tank 320; and in the 3-gallon tank approximately, 25 pounds of agent is typically needed to fill agent tank 320.

Some embodiments may use a spring-based system to detect the agent amount. For example, two different limits may be set, creating three states that can be monitored by the fire suppression system. The "spring" can have a spring constant (K) that allows for small amounts of movement (e.g., 0.010 inches per lb). In that case a 1.5 gallon tank will move the spring ⅛", and the 3-gallon tank will move the spring ¼". By placing limit switches at these distances, some embodiments can determine if the agent is below weight (e.g., no limit switch will be engaged), is at the 1.5-gallon limit but is below the 3-gallon limit (limit 1 engaged, limit 2 open), or has reached the 3-gallon limit (both limits engaged).

Some embodiments may use a load cell on which agent tank 320 sits. One advantage of the load cell is that the system can get a better view of exactly how much agent is in agent tank 320 and whether that agent is leaking or not. The load cell can also act as a secondary validation for suppression release. In addition, the specific gravity of Ansulex (10.83 #/gal), PRX (9.86 #/gal), and water (8.342 #/gal) are far enough apart that some embodiments may have encoded logic to provide details on the quantity of liquid in agent tank 320 and the contents. For example, an agent tank weighing 33 pounds has to be a 1-gallon Ansulex tank. An agent tank at 30 pounds is probably a 3-gallon PRX, but it could be a 3-gallon Ansulex that is not completely full. An agent tank weighing 25 pounds could be a 3-gallon tank of Ansulex or PRX that is low, or it could be a 3-gallon tank full of water. As such, these can be indications of improperly filled tanks, which could automatically trigger and schedule an additional inspection (e.g., by a different technician).

Either weighing system option lets the system validate if agent tanks are in place, if the agent is there, and whether we have a 1.5- or 3.0-gallon system (or some combination). Statistically speaking, at a global level, kitchen hood systems in aggregate activate on a weekly, if not daily, basis, yet not all fire suppression events are reported. Some system activations are the result of real fires, others are maintenance errors (technicians set them off inadvertently), and others are the result of improper or no maintenance (worn parts, wrong parts, non-OEM parts, etc.). Regardless of how the system is activated, a sequence of events can be triggered. There is the obvious event that the fire department must respond to, but following that, the kitchen and cooking equipment needs to be cleaned and inspected by the board of health. The fire suppression system needs to be serviced; at a minimum, the suppression agent needs to be replaced, a new gas cartridge needs to be installed, and links and nozzles may need to be replaced, as well. The fire marshal and insurance company may need to review and approve this work, too. If cooking equipment was damaged, it needs to be serviced and or replaced, as well. Having the ability to capture the activation in real time can start the process sooner and will improve data gathering on the real number of system activations, as well as the causes behind them.

While some of the micro switches in the system could provide an indication that a fire suppression system has discharged, they may not be conclusive. For example, tension can be released on the detection line to change the fusible links without removing the gas cartridge, and this would mimic a characteristic of a discharge event. Some embodiments monitor this state as a possible supervisory alarm, so it can't serve as an indicator of both. During a discharge, though, the detection line tension may be released quickly, when a pressure seal is broken on the cartridge, and high-pressure gas escapes and forces the liquid agent through the piping and nozzles. All of this activity makes noise and has acoustic signatures; the release and the puncture are highly identifiable metal-to-metal impacts, and the discharge produces a broader spectrum, longer duration and high-amplitude vibration. Accordingly, some embodiments may use microphones, vibration sensor, or other techniques to measure the acoustic signatures. Some embodiments, for example, may use an accelerometer placed on the cartridge, the puncture mechanism, the agent tank, or the discharge line (or any combination of these) to allow the system to determine various events and accurately identify a discharge.

Figure 4:
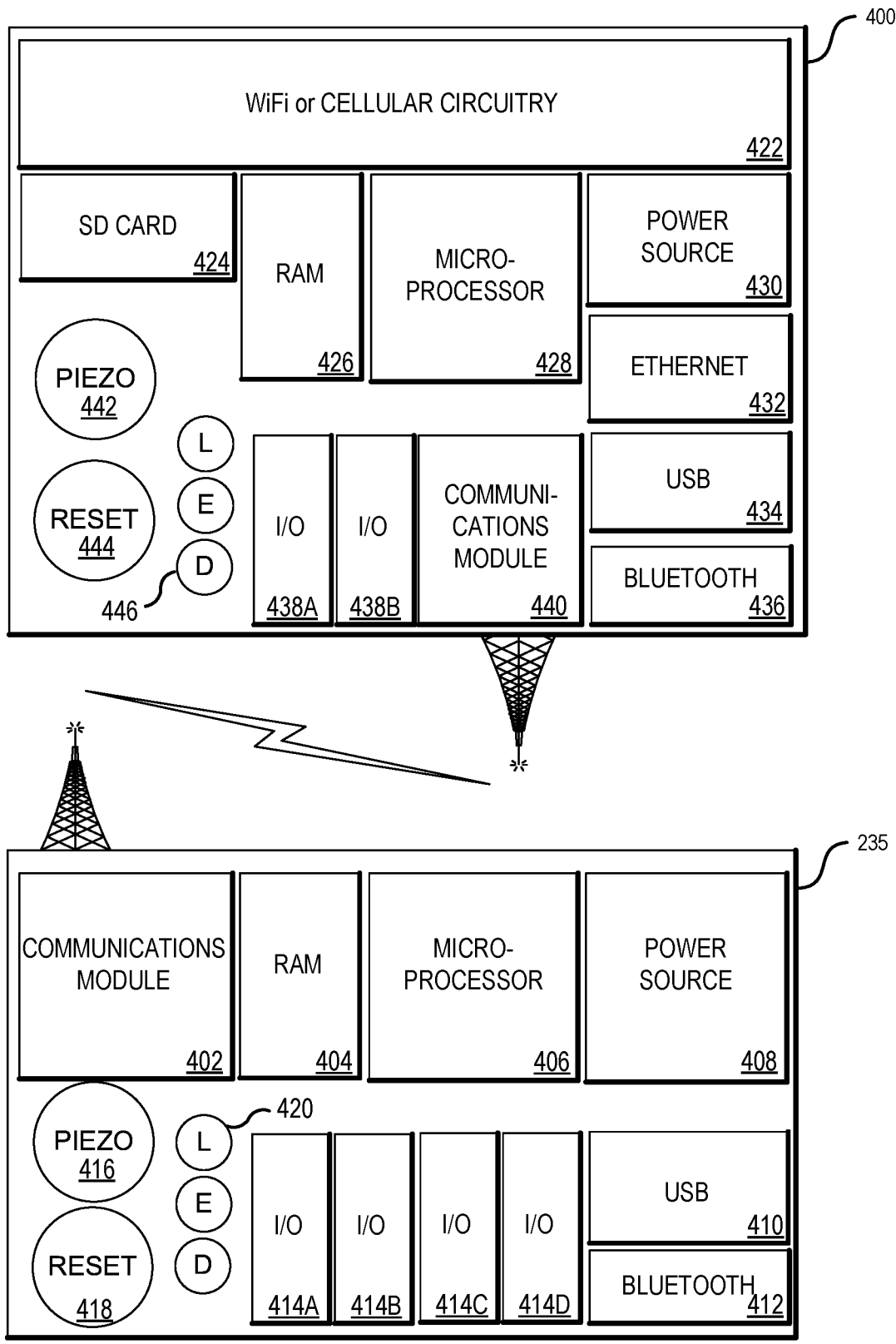
FIG. 4 illustrates a set of components within a local processing unit associated with a fire suppression system and a gateway unit capable of receiving transmissions from one or more local processing units according to one or more embodiments of the present technology.

FIG. 4 illustrates a set of components within a local processing unit 235 associated with a fire suppression system and a gateway unit 400 capable of receiving transmissions from one or more local processing units according to one or more embodiments of the present technology. In accordance with various embodiments, local processing unit 235 and gateway unit 400 can be low-power, microprocessor-based devices focused solely on a particular application. These units may include processing units, memories, I/O capabilities, audible and visual signaling devices, and external communications capabilities. For example, local processing unit 235 can include communications module 402, RAM 404, microprocessor 406, power source 408, USB 410, Bluetooth 412, I/O's 414A-414D, piezo 416, reset 418 and LEDs 420. Local processing unit 235 can communicate (e.g., wirelessly) with various sensors installed in a fire suppression system. Similarly, gateway unit 400 can include Wi-Fi or cellular circuitry 422, SD card 424, RAM 426, microprocessor 428, power source 430, Ethernet 432, USB 434, Bluetooth 436, I/O's 438A-438B, communications module 440, piezo 442, reset 444, and/or LEDs 446.

Microprocessors 406 and 428 can have unique identifiers (IDs) programmed or set at the manufacturing level. The unique IDs can be used to link or associate local processing unit 235 or gateway unit 400 with customers, particular fire suppression systems, physical sites, and/or other information.

Various embodiments of local processing unit 235 can allow a technician to configure a service delay timer. Since some systems are small (e.g., one or two tanks) and others are large (e.g., over a dozen tanks), one time delay does not work for all systems. When the cartridge is removed, the preconfigured timer starts. If the maintenance is completed within the timeframe, no warnings are issued. If the service takes longer, piezo 442 can start to beep. The technician has the option to reset/snooze the timer by depressing a button. If the technician does not reset the alarm and it is allowed to continue for a full period (e.g., 20-minute alarm is generated for another 20 minutes), then local processing unit 235 will notify an external server (e.g., monitoring platform 130) that the fire suppression system is potentially disabled and a notification can be sent to facilities management, the technician, the remote monitoring platform, and others.

During service, the tension on the detection line may be released and the cartridge may be removed. In this instance, the system still works in the same capacity, except that the second device removal restarts the timer. For example, the technician removes the cartridge, presumably weighs it, then a few minutes later releases the tension on the detection line, and that will restart the timer. When both devices are back in their normal state, the maintenance state ends and the system is considered normal again.

Upon system discharge, the microcontroller 406 in local processing unit 235 can search for a sequence of events and signatures. An example of one such sequence is the detection line tension is released, followed by a metal-to-metal vibration impact and a broader-range, extended vibration signature due to the discharge of gas. This signature is highly correlated to a discharge of gas. As such, when the system detects this signature indicative of a discharge of gas, the system will not know if this is a real fire, a test or human error without additional sensor data.

In the case of tests where agent is not used (just a system blowdown), the acoustic signature will change in both amplitude and frequency content (gas by itself has a different signature than gas and liquid combined). Low- and high-pass filtering techniques, along with Fast Fourier Transforms, can be used to ID the event and determine if it was a full discharge or blowdown. The ability to identify this automatically allows the system to earmark the event as a test rather than an alarm (or vice versa).

In the case of a real discharge, the system can inform the system owner and appropriate/assigned maintenance provider of the discharge via e-mail, text message, phone call or other communications protocols. The provisions can be made at the remote monitoring platform to define the discharge event as Real, Test or False Discharge (with additional details) after an inspection is performed. This allows the end user to begin recording a history, which also affords parent companies, insurance providers, and equipment manufacturers an opportunity to assess the probability and types of discharge events that are happening.

Owners and system service providers can be notified within seconds of the discharge event. User profiles enable the end user to define his or her type or types of notification and when they occur (any time versus specific times). Accordingly, the notification capabilities are not solely limited to alarm or discharge notifications. Since the system is capable of identifying maintenance activity and/or normal states, the system can be configured to notify end users, technicians and customers of said states.

Service events do not initially generate external notifications. If a service technician receives a local warning (piezo buzzing) and acknowledges the warning by depressing the button on the microcontroller, then no external warning is sent. If, however, the piezo 416 continues to sound for another predefined period of time, then we must presume that the technician has left the system in a non-operational state, and the system will send out external "System Inoperable" notifications. If an external line is not available, the system will attempt to send a message (e.g., via Bluetooth).

I/Os 414A-414D can be simple contact closure with a mechanical option to connect a switch to the normally open or normally closed terminals. This can help accommodate a variety of system configurations and may result in less field programming. Audible and visual warnings can be local (within the vicinity of the monitored system). For example, visual indicators may be board-based LED's 420, and audible would be a buzzer or piezo 416. Other embodiments may also include dry or wet contacts to provide binary alarm, warning, supervisory, trouble or other alerts to secondary fire, security, building automation or like systems on site.

Local processing unit 235 and gateway unit 400 can have a variety of external communications. In some embodiments, these components can support serial or USB communications so that the device can be programmed, configured or interrogated. A local Ethernet port 432 (supporting POE) may also be available in some embodiments. Additional communications options may include the ability to add a daughter board for Wi-Fi or Cellular connectivity. This component can allow all data and events local to the system to a centralized server (e.g., remote monitoring platform 130).

The electronics portions can support power management (light blue), input and output (grey), local storage (green—static and dynamic), communications (dark blue—standard, orange—optional) and MMI interface components (yellow). Since these fire suppression system are typically pure mechanical systems with no AC or DC power feed, power can be battery-based, with super caps and scavenging support. In the case of battery operation, Wi-Fi and Cellular communications may not feasible, so external notification may be limited to Bluetooth connectivity to the technician's phone or a local platform.

If the sensor package is installed in the enclosure 215, gateway unit 400 may be closer to power and or network connections. As such, some embodiments may use a battery in the sensor package and one of the three power options noted above. The local processing unit may be battery powered, but if this is the only form of power, many types of external communications may quickly drain the battery. If gateway unit 400 is installed in an enclosure (e.g., enclosure 215 in FIG. 2) a variety of power options may be utilized including, but not limited to, the following options:

Power option #1—Power over Ethernet. With this option, the unit could still use a battery (as a backup), but the Ethernet port could be used for power and hardwired communications.

Power option #2—Local Power. A wall wart power supply and an onboard battery (as backup) could be used.

Power option #3—Panel Power. Pulling 12 or 24 volts from the onsite fire alarm panel is another option. With jurisdictions starting to require a link to and from the restaurant system to the fire alarm control panel, this option may be a viable option.

Rather than put the entire system in the fire suppression system back box, some embodiments break the system into two parts: a small communications and sensor package. The link between the two components may be a lower frequency, low-bandwidth wireless link, thus allowing us to move the higher power components closer to a power source and an Ethernet connection or better cell coverage.

Some embodiment may use LoRa® (https://www.lora-alliance.org/)—a low power wide area network that would provide an encrypted link from the fire suppression system to gateway unit 400. Gateway unit 400 has the potential to interface with multiple LoRa slaves so that one gateway unit may serve as the host to multiple hood systems at a large catering or hotel complex. In addition, some embodiments may add in other items to be monitored, like refrigeration, HVAC, burglar alarms, sprinkler systems, fire extinguishers and fire alarm control panels, if necessary.

Various embodiments of the LoRa-enabled system may include at least two major components: a small sensor package (at least one) and a larger gateway unit (only one). The sensor package transmits signals from local, low-power sensors back to gateway unit 400 where they are processed and forwarded on to an external server using the Ethernet, Wi-Fi or cellular connection. If additional systems are to be monitored at the site, a LoRa-based sensor package can be added and configured to communicate with gateway unit 400.

Figure 5:
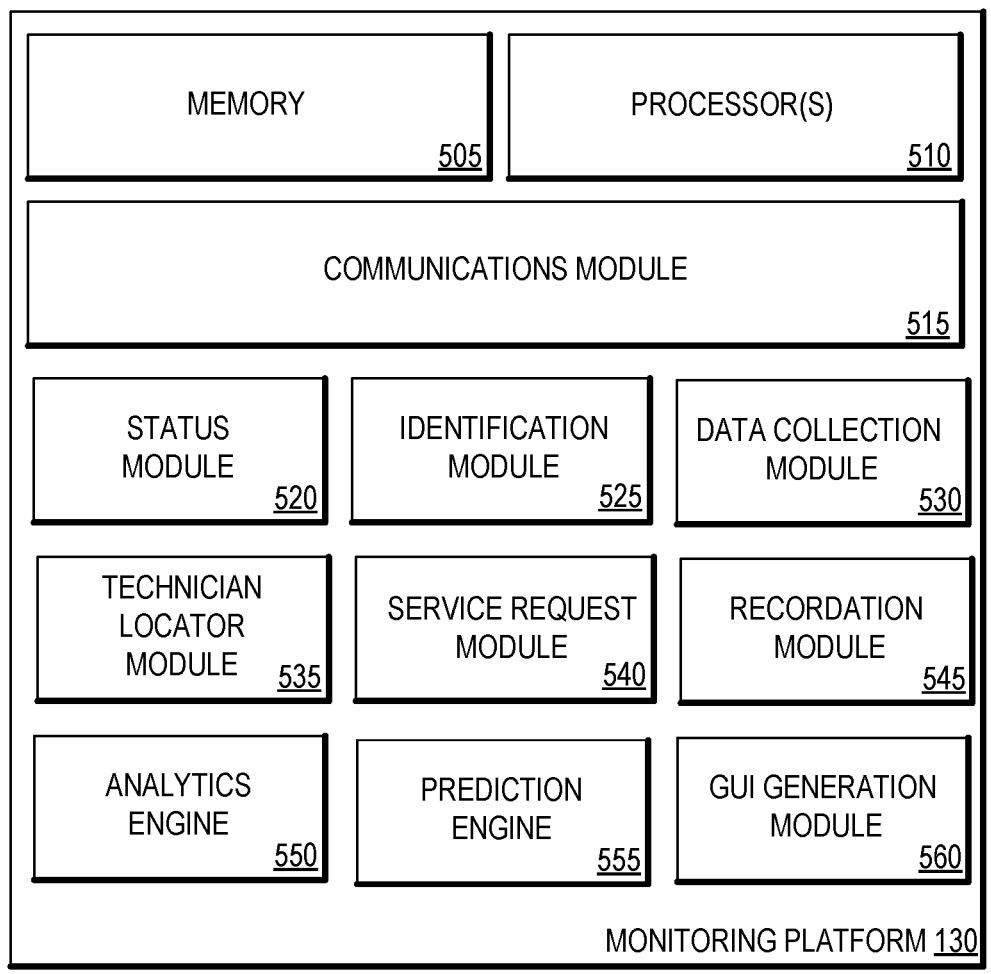
FIG. 5 illustrates a set of components within a monitoring platform in accordance with some embodiments of the present technology.

FIG. 5 illustrates a set of components 500 within a monitoring platform in accordance with some embodiments of the present technology. According to the embodiments shown in FIG. 5, monitoring platform 130 can include memory 505, one or more processors 510, communications module 515, status module 520, identification module 525, data collection module 530, technician locator module 535, service request module 540, recordation module 545, analytics engine 550, prediction engine 555, and graphical user interface (GUI) generation module 560. Each of these modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special-purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, status module 520 and identification module 525 can be combined into a single module for determining the status of one or more fire suppression systems.

Memory 505 can be any device, mechanism, or populated data structure used for storing information. In accordance with some embodiments of the present technology, memory 505 can encompass any type of, but is not limited to, volatile memory, nonvolatile memory and dynamic memory. For example, memory 505 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 505 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 505.

Memory 505 may be used to store instructions for running one or more applications or modules on processor(s) 510. For example, memory 505 could be used in one or more embodiments to house all or some of the instructions needed to execute the functionality of communications module 515, status module 520, identification module 525, data collection module 530, technician locator module 535, service request module 540, recordation module 545, analytics engine 550, prediction engine 555 and/or GUI generation module 560. While not shown in FIG. 5, in some embodiments, an operating system can be used to provide a software package that is capable of managing the hardware resources of monitoring platform 130. The operating system can also provide common services for software applications running on processor(s) 510.

Communications module 515 can be configured to manage and translate any requests from external devices (e.g., mobile devices 110A-110N, fire suppression systems, etc.) or from graphical user interfaces into a format needed by the destination component and/or system. Similarly, communications module 515 may be used to communicate between the system, modules, databases, or other components of monitoring platform 130 that use different communication protocols, data formats, or messaging routines. For example, in some embodiments, communications module 515 can receive measurements of the current state of one or more fire suppression systems. Communications module 515 can be used to transmit status reports, alerts, logs, and other information to various devices.

Status module 520 can determine the status of one or more fire suppression systems. For example, status module 520 may use communications module 515 to directly request a status of a fire suppression system from one or more gateways or local processing units. Identification module 525 can be configured to receive sensor data generated by the fire suppression system. Using the received sensor data, identification module 525 can then identify an operational status of the fire suppression system. The operational status and/or the sensor data itself can then be recorded within a fire suppression profile in a database. As a result, the fire suppression profile can provide a history of the operational status of the fire suppression system over time. In accordance with some embodiments, the operational status can include a functional status indicating that the fire suppression system will operate as expected, a maintenance status indicating that the fire suppression system is under maintenance, a discharge status indicating that the fire suppression system has been discharged, and an inoperative status indicating that the fire suppression system will not operate as expected.

Data received via communications module 515 can be accessed by data collection module 530 for processing, formatting, and storage. Data collection module 530 can keep track of the last communication from each of the fire suppression systems and generate an alert if any fire suppression system fails to report on schedule (e.g., every minute, every five minutes, or other preset schedule). Data collection module 530 can also review the quality of the data received and identify any potential issues. For example, if a data set from a fire suppression system includes various sensor data, data collection module 530 can analyze the data to determine any erratic behavior or outliers that may indicate that a sensor is beginning to fail.

Technician locator module 535 can be configured to receive location and schedule updates from mobile devices associated with technicians. Service request module 540 can be configured to identify when the operational status of the fire suppression system is inoperative and identify an available technician using the technician locator. As a technician is servicing a fire suppression system, he or she may use a computer application or a mobile application to report various findings, observations, parts replaced, and the like. As this information is transmitted to monitoring platform 130, recordation module 545 can record the information from the technician in the appropriate fire suppression profile.

Analytics engine 550 can analyze the sensor data and generate a correlation model that is predictive of when a discharge of the fire suppression system is likely. In some cases, analytics engine can use the sensor data as well as other types of information such as observations from the technicians during inspections. Prediction engine 555 can be configured to process the sensor data in real-time against the correlation model generated by the analytics engine 550 and generate an inspection request upon determination that the discharge of the fire suppression system is likely. In some embodiments, prediction engine 555 can also process the sensor data in real-time against the correlation model generated by analytics engine 550 and send a signal to the fire suppression system to automatically cutoff a gas line. Analytics engine 550 can also monitor the sensor data and generate other types of analytics.

One example of how analytics engine 550 can be used includes analyzing the number of heat cycles of the appliance to create a dynamic service schedule for each location. As a result, low use locations (e.g., high schools) may have longer times between maintenance visits than higher use locations. This information can be used by service request module 540 to automatically schedule maintenance visits. As another example, analytics engine 550 can analyze actual system discharge data and the amount of damage (e.g., based on information collected from an insurance adjustor or other source) to identify system design issues. This information can be used to redesign systems and/or increase or reduce insurance premiums. Many additional examples exists of how analytics engine 555 may be utilized.

GUI generation module 560 can generate one or more GUI screens that allow for interaction with a user. In at least one embodiment, GUI generation module 560 can generate a graphical user interface allowing a user to set preferences, review reports, create profiles, set device constraints, and/or otherwise receive or convey information about device customization to the user. For example, in some embodiments, GUI generation module 560 can be configured to retrieve, from the database, the operational status from the multiple fire suppression profiles. Once the operational status has been retrieved, GUI generation module 560 can generate a graphical user interface allowing a user to see the operational status of any of the fire suppression profiles.

Figure 6:
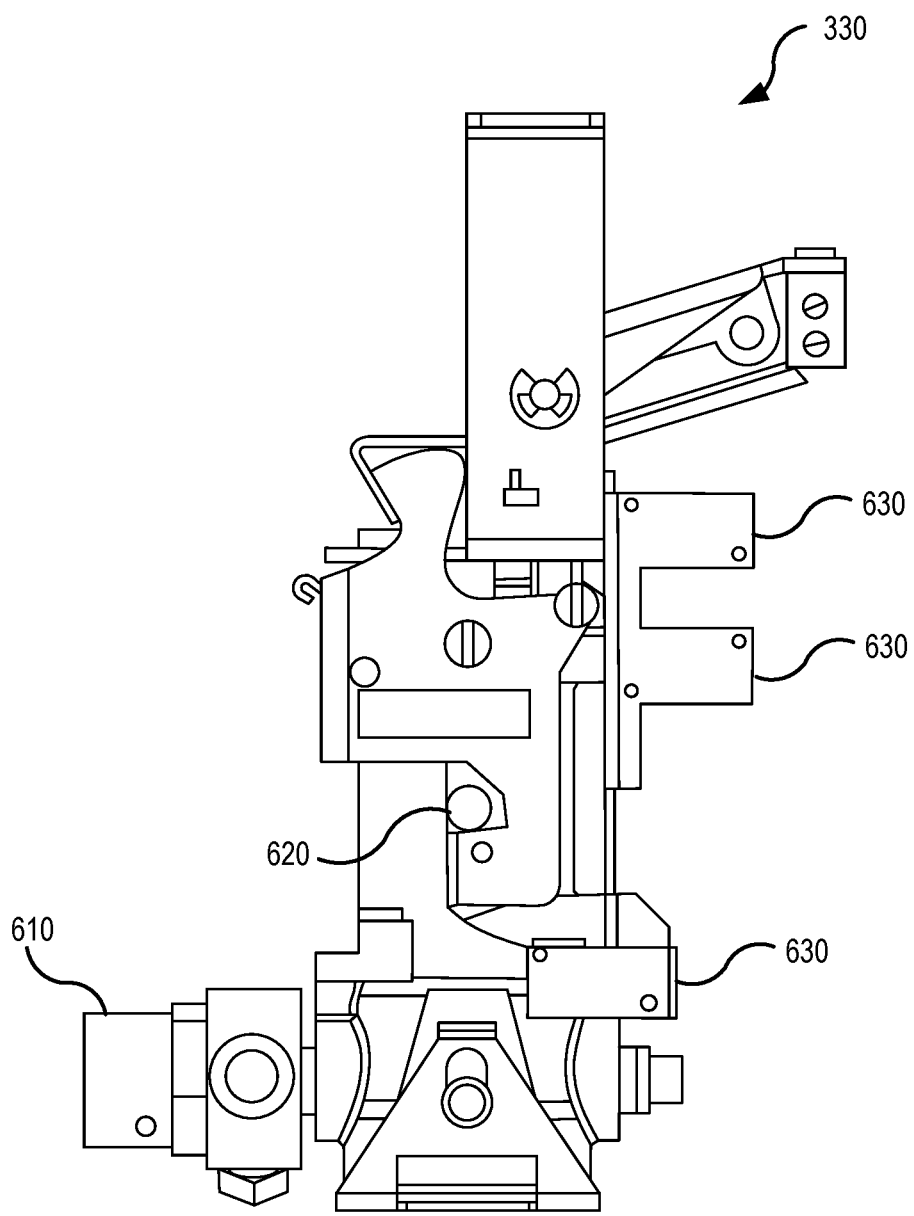
FIG. 6 illustrates an assembly with various sensors capable of communicating with a local processing unit in accordance with various embodiments of the present technology.

FIG. 6 illustrates release assembly 330 with various sensors capable of communicating with a local processing unit in accordance with various embodiments of the present technology. When the detection line is activated, a preloaded spring in release assembly 330 drives a pin into a seal on the pressurized cartridge (not shown in FIG. 6). This releases a high-pressure gas that travels through pressure regulator 610 and into the agent tank (not shown in FIG. 6). This forces the agent through the distribution piping and to one or more nozzles over the appliance or cooking area.

Pin 620 indicates the current position of pin 620 that is capable of puncturing the seal on the pressurized cartridge. Typically, there is a position indicating rod connected to pin 620, which is long enough that it extends out of release assembly 330 and lines up with an opening on the front cover of enclosure 215. In traditional systems, this has been the only indication that the system is loaded and/or discharged. Pin 620, nor the position indicating rod, does not provide any indication as to whether the pressurized cartridge is in place.

Sensors 630 (e.g., switches) can be installed to monitor various states of the system, such as, but not limited to, loaded state of the detection line, presence of the pressurized cartridge, and the like. The sensors can be communicably connected to remote monitoring circuitry (e.g., a fire alarm control panel, a local processing unit, etc.) to provide an indication of whether the fire suppression system has discharged.

While not illustrated in FIG. 6, release assembly 330 may have multiple additional sensors to aid in monitoring states of the fire suppression system. For example, pressure regulator 610 may also include or have attached thereto an accelerometer. Signals created by the accelerometer can provide additional information about whether the canister has been discharged. While the location of the accelerometer(s) can vary, one advantage of placing one accelerometer on pressure regulator 610 is the direct contact with pin 620 and the cartridge. As a result, the accelerometer can monitor for any puncture or gas discharge by detecting local vibrations.

Figure 7:
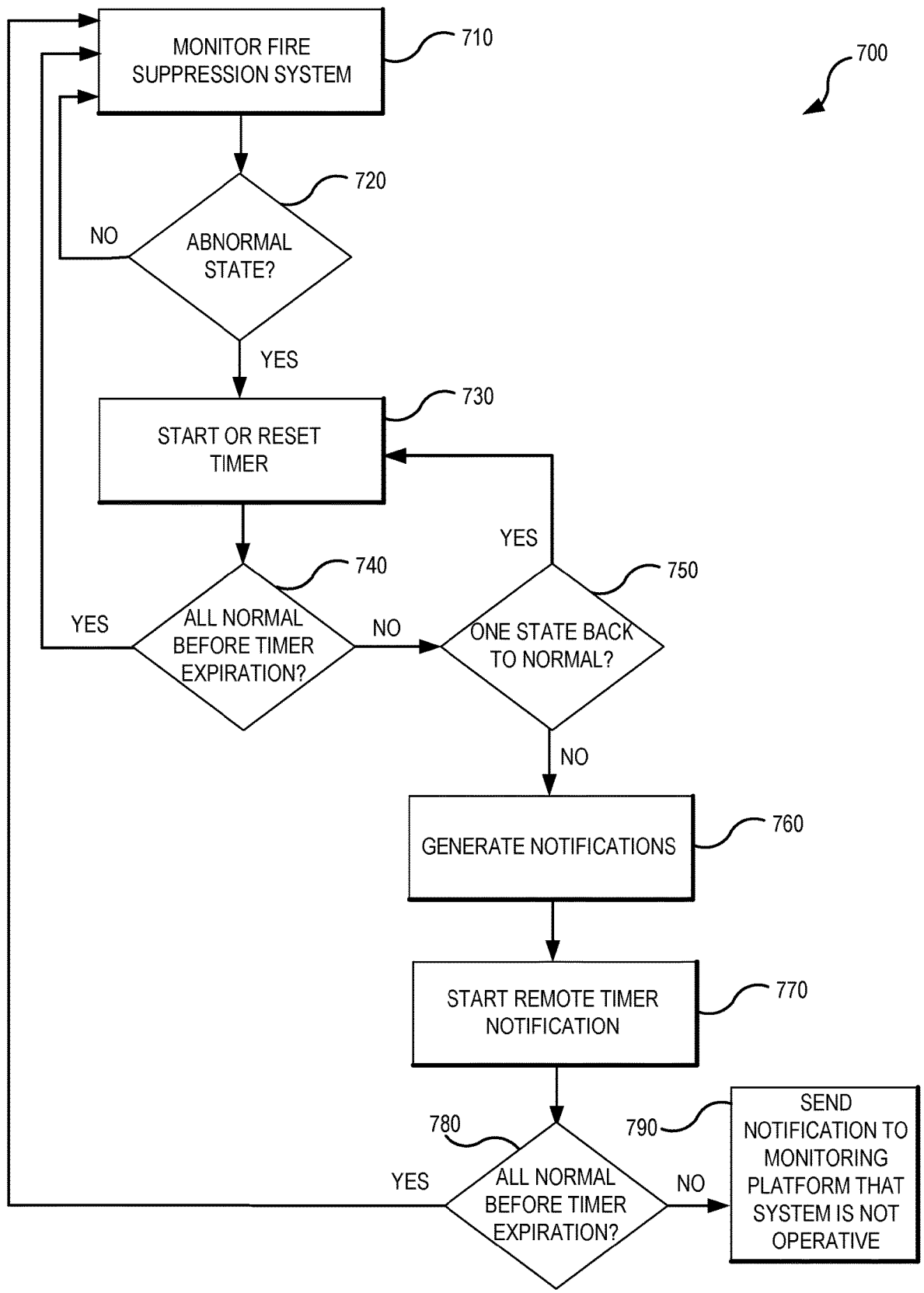
FIG. 7 is flowchart illustrating a set of operations for determining when to transmit a notification to a monitoring platform that the fire suppression system is not fully operative in accordance with one or more embodiments of the present technology.

FIG. 7 is flowchart illustrating a set of operations 700 for determining when to transmit a notification to a monitoring platform that the fire suppression system is not fully operative in accordance with one or more embodiments of the present technology. In some embodiments, the operations illustrated in FIG. 7 may be performed by various components of the fire suppression system, including, but not limited to, one or more local processing units and/or gateway units associated with a fire suppression system.

As illustrated in FIG. 7, monitoring operation 710 can monitor a fire suppression system. For example, a fire suppression system can transmit signals from various sensors associated with the fire suppression system. As these signals are received, determination operation 720 can determine if the system is in an abnormal state. Examples of abnormal states can include deactivation of the detection line, missing cartridge, incorrect or missing fire suppression agent, excessive heat, flow of a fire suppression agent, and the like. When determination operation 720 determines that the fire suppression system is in a normal state, determination operation 720 branches back to monitoring operation 710. When determination operation 720 determines that the fire suppression system is in an abnormal state, then determination operation 720 branches to timing operation 730 where a timer is initiated.

The amount of time set for the timer in timing operation 730 may be static (e.g., thirty seconds, five minutes, etc.) or dependent on the type of abnormal state that is detected. For example, if the canister is missing, then timing operation 730 may set the timer for twenty minutes to give the technician time to remove, weigh and reinstall the cartridge. Similarly, timing operation 730 may set the timer to thirty seconds when a thermocouple detects a temperature above a specific threshold that could indicate a fire or steam cleaning of the hood assembly. In the event multiple abnormal states are detected, timing operation 730 may set the timer to the minimum time associate with the detected abnormalities or create a new time (e.g., an average or a weighted average).

Expiration operation 740 monitors the abnormal states and the timer. Upon expiration of the timer, if the abnormal states have all returned to normal, then expiration operation 740 branches to monitoring operation 710. If expiration operation 740 determines that the abnormal states have not all returned to normal, the expiration operation 740 branches to state evaluation operation 750 where a determination is made as to whether one or more states have returned to normal. When state evaluation operation 750 determines that one or more states have returned to normal, state evaluation operation 750 branches to timing operation 730 where a new timer is set. When state evaluation operation 750 determines that one or more states have not returned to normal, then state evaluation operation 750 can branch to generation operation 760 where one or more notifications can be sent to a technician and/or other party (e.g., building operator). The notifications may be sent via one or more communication channels. For example, lighting a display, text message, e-mail, automated phone call, fax, push notification, and/or the like.

Once the notifications have been generated, then remote timing operation 770 starts a time for a specified period of time. Again, the time set by remote timing operation 770 may be static or dynamic, as described above. As one additional example, remote timing operation 770 may set the timer, at least in part, based on whether or not a response was from the technician and/or a third party in response to the notifications. Clearing operation 780 can determine whether all the states have returned to normal before the timer expires. When clearing operation 780 determines all states have returned to normal, then clearing operation 780 branches to monitoring operation 710. When clearing operation 780 determines that there is at least one remaining abnormal state, then clearing operation 780 branches to reporting operation 790 which sends one or more notifications to a monitoring platform (or other device) that the system is not operative or is discharging.

Figure 8:
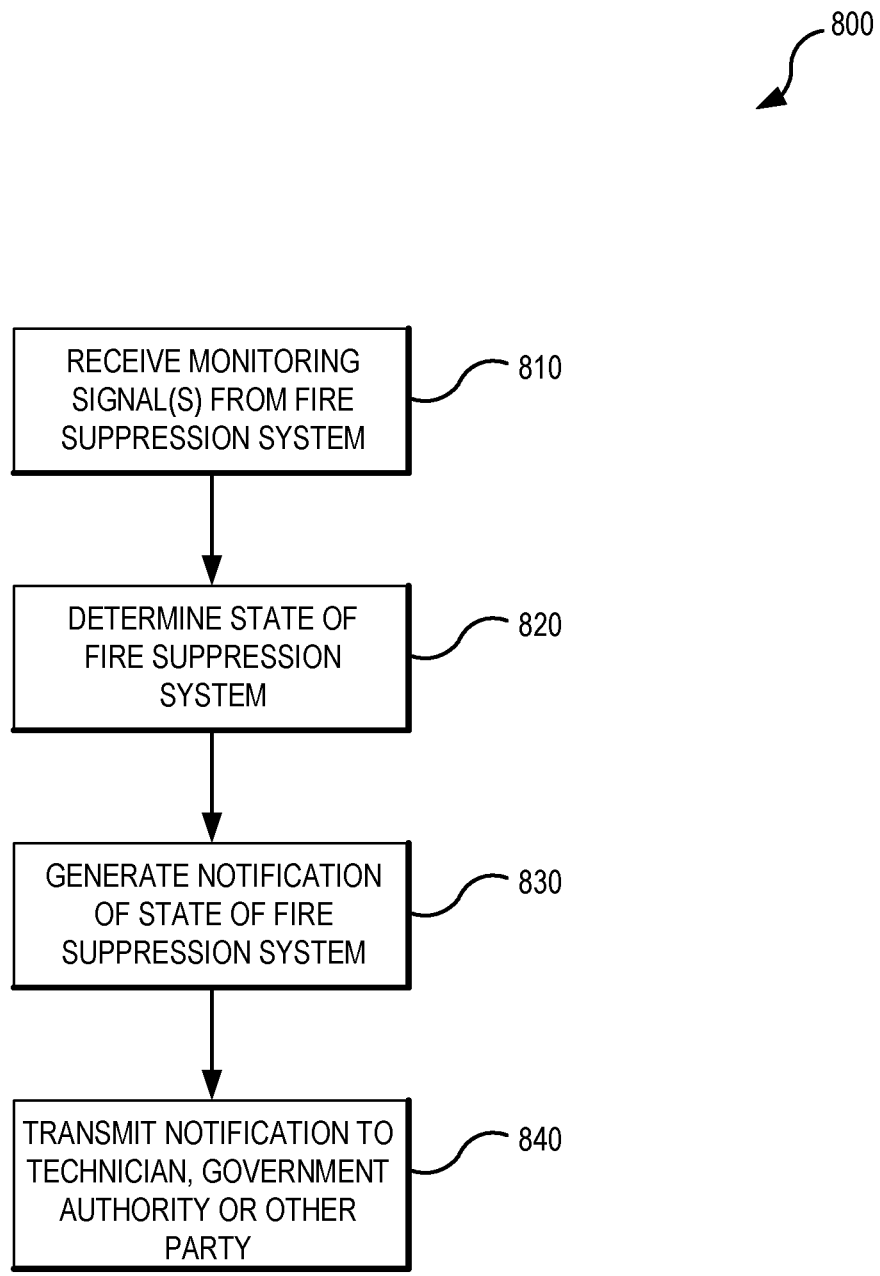
FIG. 8 is a flowchart illustrating a set of operations for sending notifications regarding the status of a fire suppression system in accordance with some embodiments of the present technology.

FIG. 8 is a flowchart illustrating a set of operations 800 for sending notifications regarding the status of a fire suppression system in accordance with some embodiments of the present technology. The operations illustrated in FIG. 8 can be performed by various components of the fire suppression system including, but not limited to, one or more local processing units, gateway units, mobile devices, local gateway, monitoring platform, or one or more components (e.g., processor(s) 406 or 428), engines, and/or modules associated with these devices. As illustrated in FIG. 8, receiving operation 810 can receive one or more monitoring signals from the fire suppression system. These signals may include raw or processed sensor data. Using the monitoring signals, determination operation 820 can determine the state of the fire suppression system. Once the state of the fire suppression system has been determined, generation operation 830 can generate a corresponding notification. Transmission operation 840 can then transmit the notification to a technician, building supervisor, government authority, or other party.

Figure 9:
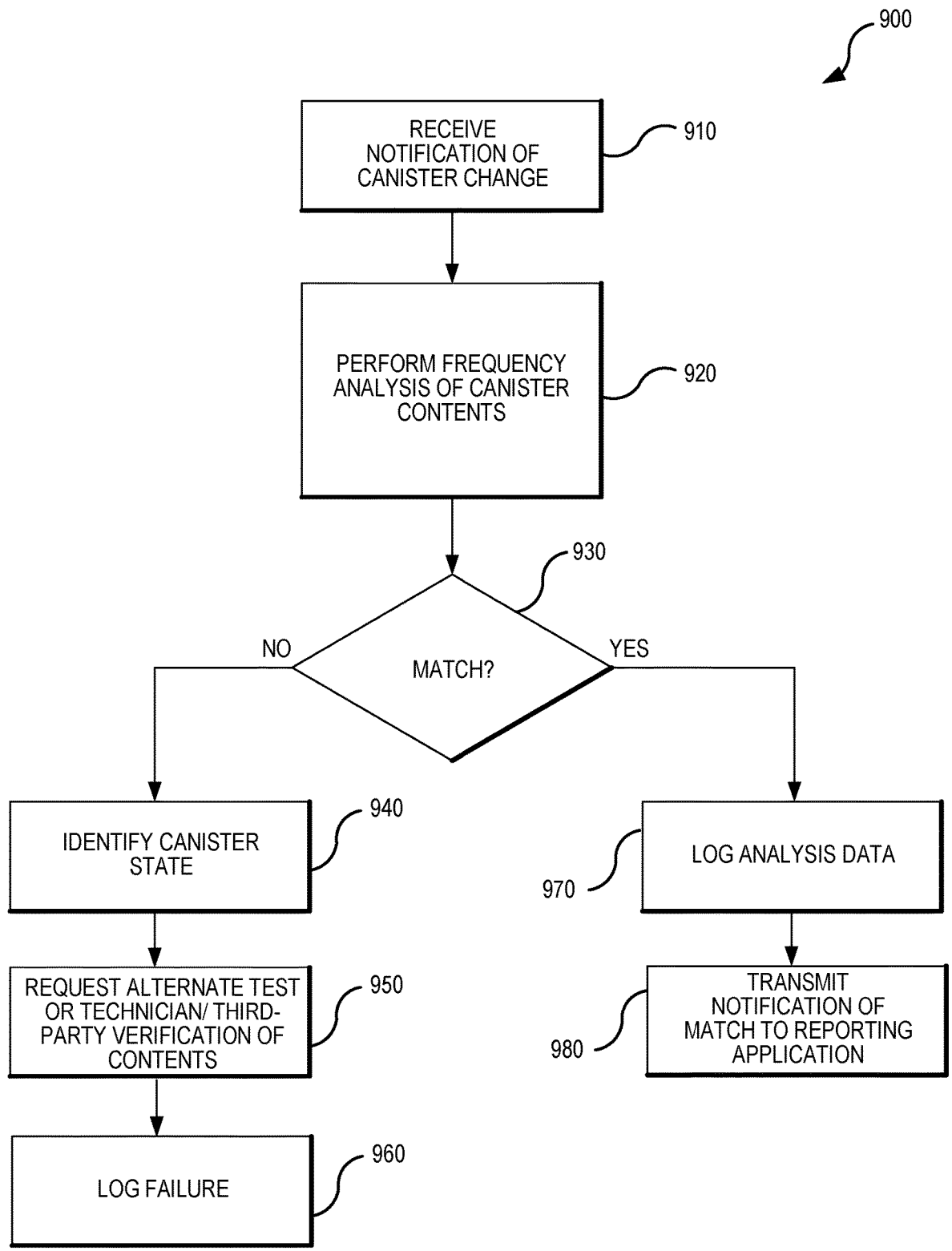
FIG. 9 is a flowchart illustrating a set of operations for analyzing contents of a canister in accordance with various embodiments of the present technology.

FIG. 9 is a flowchart illustrating a set of operations 900 for analyzing contents of a canister in accordance with various embodiments of the present technology. The operations illustrated in FIG. 9 can be performed by various components of the fire suppression system including, but not limited to, one or more local processing units, gateway units, mobile devices, monitoring platform, or one or more components (e.g., processor(s) 406 or 428), engines, and/or modules associated with these devices. As illustrated in FIG. 9, receiving operation 910 can receive a notification of a canister change. This may be automatically generated, for example, in response to a signal generated by a sensor affiliated with a canister attachment point when the canister has been removed or is not present and has been replaced.

Analysis operation 920 can generate a frequency analysis of the canister. For example, a hammer, trigger or other vibrations inducing mechanism can be used to knock the canister. A sensor at the other end of the canister can record the vibrations that have traveled through the canister. During determination operation 930, a determination can be made as to whether the results of the frequency analysis match a desired profile. When determination operation 930 determines that a match is not present, determination operation 930 can branch to identification operation 940 where an identification of the canister state can be made. For example, in some embodiments, identification operation 940 can determine if the canister is empty, only partially filled, filled with the wrong fire suppression agent, is the wrong size of canister, or the like. This can be done, for example, by matching the frequency analysis against a variety of different profiles or for particular features (e.g., peaks at certain frequencies) of the frequency analysis. Depending on the results, additional tests may be selected or a request for a technician/third-party verification of the canister can be generated during verification operation 950. Logging operation 960 can log the failures.

When determination operation 930 determines that a match is present, determination operation 930 can branch to logging operation 970 where the match is recorded. Then, transmission operation 980 can transmit a notification of the match to a reporting application (e.g., that is running on a mobile device of a technician or on a remote monitoring platform).

Figure 10:
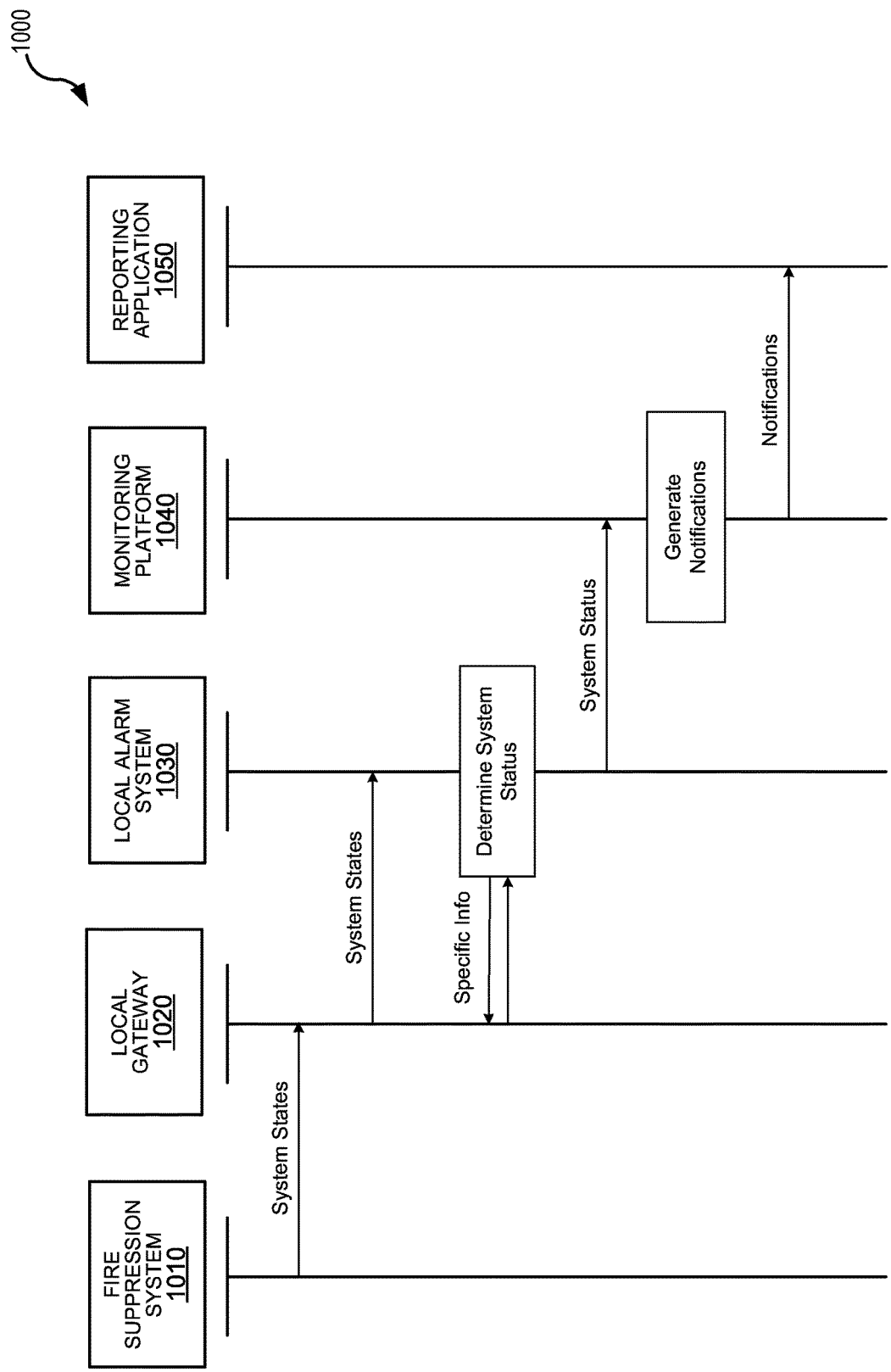
FIG. 10 illustrates an example of a sequence diagram illustrating message flow between various components of a fire suppression system with remote monitoring that may be used in one or more embodiments of the present technology.

FIG. 10 illustrates an example of a sequence diagram 1000 illustrating message flow between various components of a fire suppression system with remote monitoring that may be used in one or more embodiments of the present technology. As illustrated in FIG. 10, fire suppression system 1010 can send one or more system states (e.g., sensor data) to a local gateway 1020. Local gateway 1020 then communicates the system states to local alarm system 1030 which can determine the system status by communicating directly with the local gateway. Once a local alarm system has determined the system status, the local alarm can act. For example, the local alarm may shut off gas to an appliance, reroute air flow using the heating and ventilation system, open doors, sound alarms, and/or the like. The system status can be transmitted to monitoring platform 1040 where one or more notifications can be generated and transmitted to reporting application 1050 (e.g., associated with monitoring platform 1040, running on one or more remote devices, displays, etc.).

Figure 11:
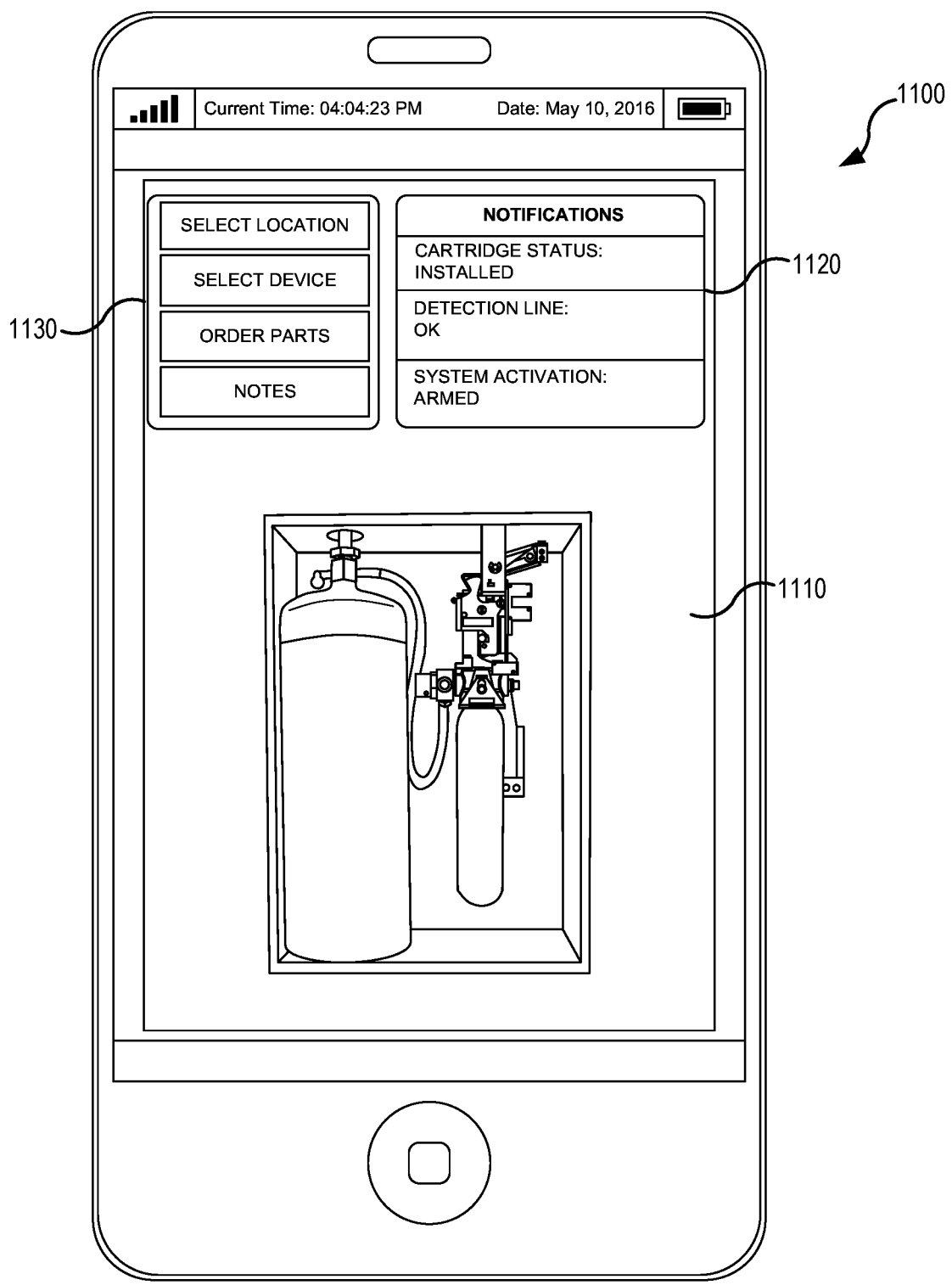
FIG. 11 is an example of a graphical user interface that may be used in accordance with some embodiments of the present technology.

FIG. 11 is an example of a graphical user interface 1100 that may be used in accordance with some embodiments of the present technology. As illustrated in FIG. 11, graphical user interface 1100 can include visualization area 1110, notification area 1120, and interactive area 1130. Graphical user interface 1100 can be running on a laptop or other mobile device and accessed by a technician performing maintenance or installing a fire suppression system. The laptop or other mobile device may connect directly (e.g., via Bluetooth, IP connection, etc.) to a local processing unit or indirectly via monitoring platform 130.

Visualization area 1110 can present an actual image or video of parts of the fire suppression system in order to allow the technician to quickly identify any potential issues. In some embodiments, visualization area 1110 may present a virtual representation of parts of the fire suppression system. The image presented, whether actual or virtualized, may highlight potential issues to aid in review of the user. For example, if an agent tank is not vertical, this could be highlighted with various overlays of different colors, movement showing that the agent tank needs to be inspected, presented in a magnified fashion, and the like.

Notification area 1120 can provide various notifications regarding the state of the system and any sensor measurements. This can include, for example, current temperatures, status of the cartridge, detection line, agent tank, agent within the agent tank, and/or whether the system is fully functional. Interactive area 1130 can allow the technician to select a location/fire suppression system with which to connect, order parts, take notes on the system, and/or the like. Some embodiments of the graphical user interface 1100 can allow a user to suppress any alarms that would be generated while the system is under maintenance. In response to the request received via graphical user interface 1100, one or more signals can be generated and transmitted to monitoring platform 130 and/or local processing unit to suppress alarm notifications during a period of time.

In accordance with some embodiments, graphical user interface 1100 may allow a technician to provide or confirm information regarding the system configuration. This information can then be analyzed to automatically validate the system installation. For example, if the technician (or sensors) identify a three gallon tank with seventeen dedicated nozzles, a flag can be raised that the system may not operate as desired due ratio of tank sized to the number of nozzles. The system can alert the technician and/or other party regarding the potential system flaw.

Figure 12:
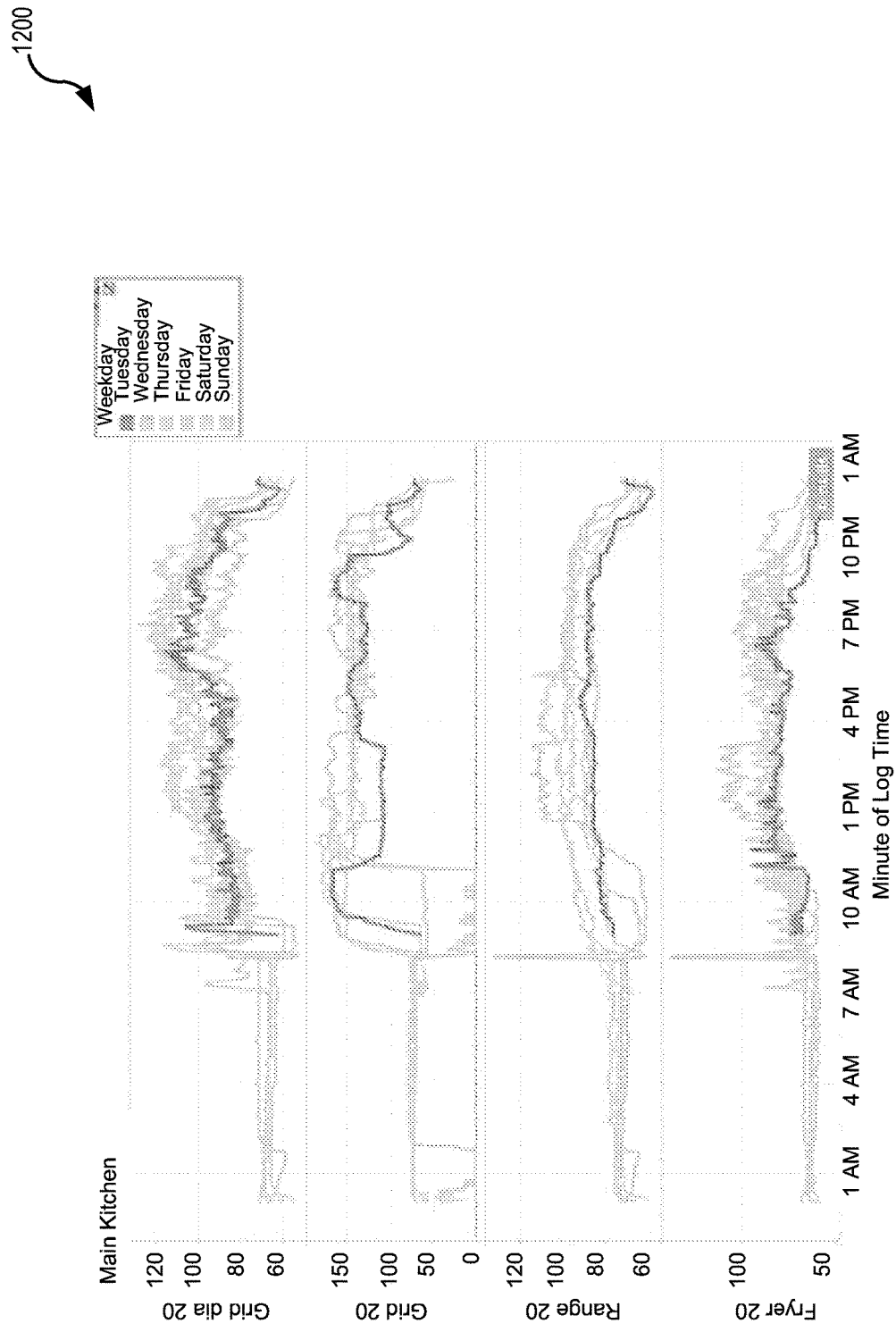
FIG. 12 is an example of a graphical user interface screen illustrating plots of data collected via a fire suppression system with remote monitoring in accordance with various embodiments of the present technology.

FIG. 12 is an example of graphical user interface screen 1200 visualizing data collected via a fire suppression system with remote monitoring in accordance with various embodiments of the present technology. In particular, graphical user interface 1200 shows temperature data from multiple days of the week overlaid for various areas that are being monitored. As this sensor data is collected and analyzed, various embodiments of the fire suppression system can identify trends and automatically generate notifications and interact with other building systems (e.g., gas lines, HVAC, etc.).

For example, from the data illustrated in FIG. 12, the system may conclude that the fryer and range should be turned off from 1 AM to 8 AM on any given day. As such, when the fire suppression system detects that the fryer or range is still producing heat during these periods, a notification can be sent to one or more parties (e.g., building manager, building security, etc.). In some embodiments, the fire suppression system may send a signal to automatically turn off an appliance, gas feed to the appliance, or electricity feed to the appliance. As another example, various embodiments of the fire suppression system may connect with a reservation system to determine if a private event or training session is occurring during the typically inactive time periods. If an event or training session has been scheduled, then the fire suppression system may take no action. If, however, no event or training session has been scheduled, the fire suppression system may generate notifications or send signals to reduce the heat being produced.

As discussed above, the sensor data for multiple systems can be analyzed (e.g., via automated machine learning algorithms such, but not limited to, support vector machines, k-mean, principal component analysis, and the like) to identify normal operating conditions and those features that may be predictive of when a discharge of the fire suppression system is likely. The fire suppression system (e.g., the monitoring platform 130) could generate, in response to conditions that are predictive of a discharge, an immediate inspection request.

Figure 13:
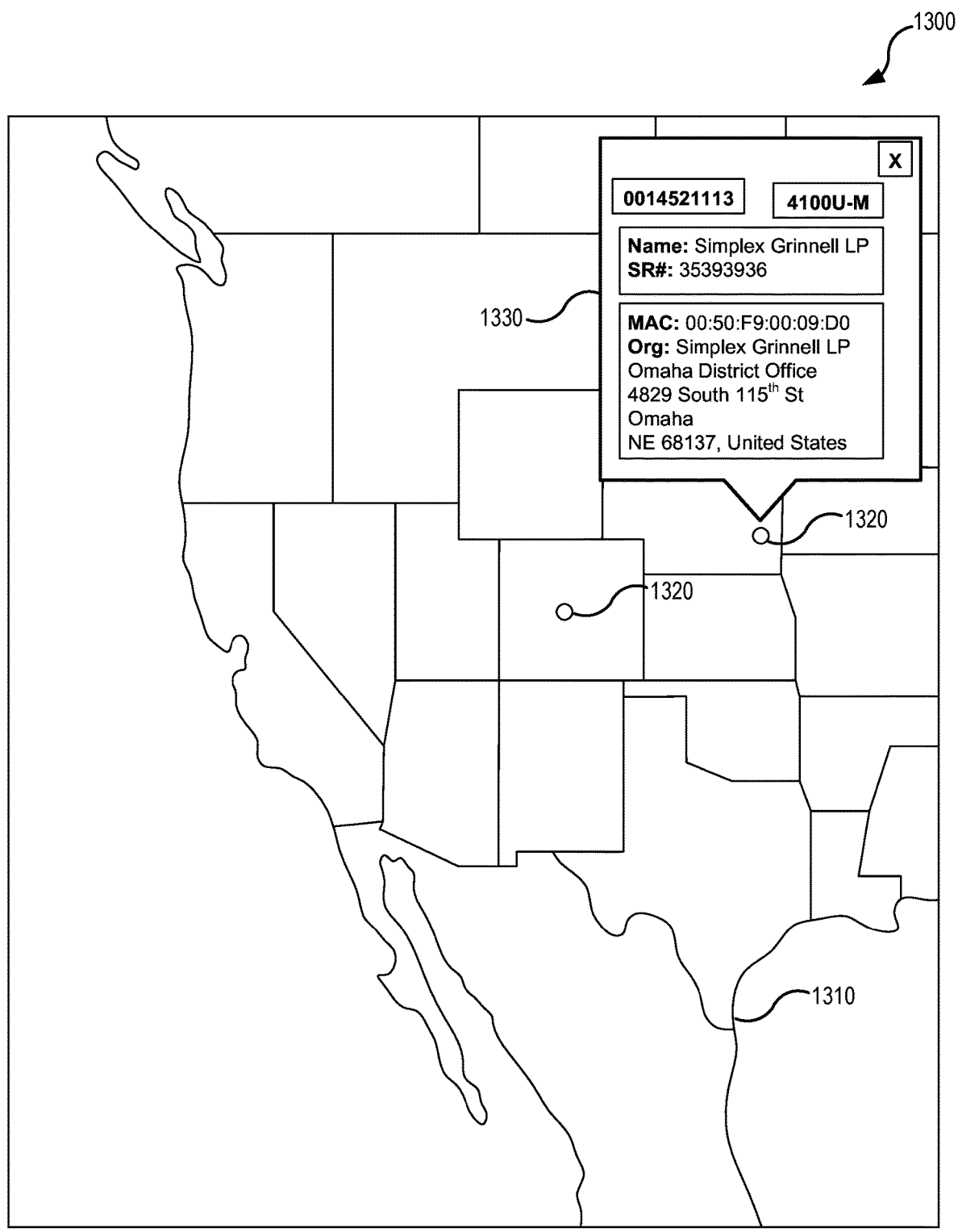
FIG. 13 is an example of a graphical user interface that may be used in accordance with various embodiments of the present technology.

FIG. 13 is an example of graphical user interface 1300 that may be used in accordance with various embodiments of the present technology. In accordance with various embodiments, a user can monitor multiple fire suppression systems via graphical user interface 1300 which provides a centralized reporting platform for companies having multiple properties with fire suppression systems. In the embodiments illustrated in FIG. 13, map 1310 is presented with multiple locators 1320 representing the location of the fire suppression systems. When a user selects one of locators 1320, a callout 1330 is generated that presents specific system information. This can include identification information, such as, but not limited to, assigned names, MAC addresses, physical addresses, serial numbers, and the like. Other information from a fire suppression profile may be retrieved and presented within callout 1330. This can include current and historical state information, sensor data, streaming video, recent images (e.g., that update periodically or upon request), a list of components of the fire suppression system, a list of sensors available on the fire suppression system, contact information (e.g., phone numbers, mailing addresses, etc.), maintenance logs, and other information. Accordingly color coded pins or bubbles can be defined so the high-level status of locations 1320 can be determined visually. For example, a discharged system may use a red marker while a system undergoing maintenance may be marked by blue and one deemed inoperable might be black or yellow.

Exemplary Computer System Overview

Aspects and implementations of the fire suppression system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 14:
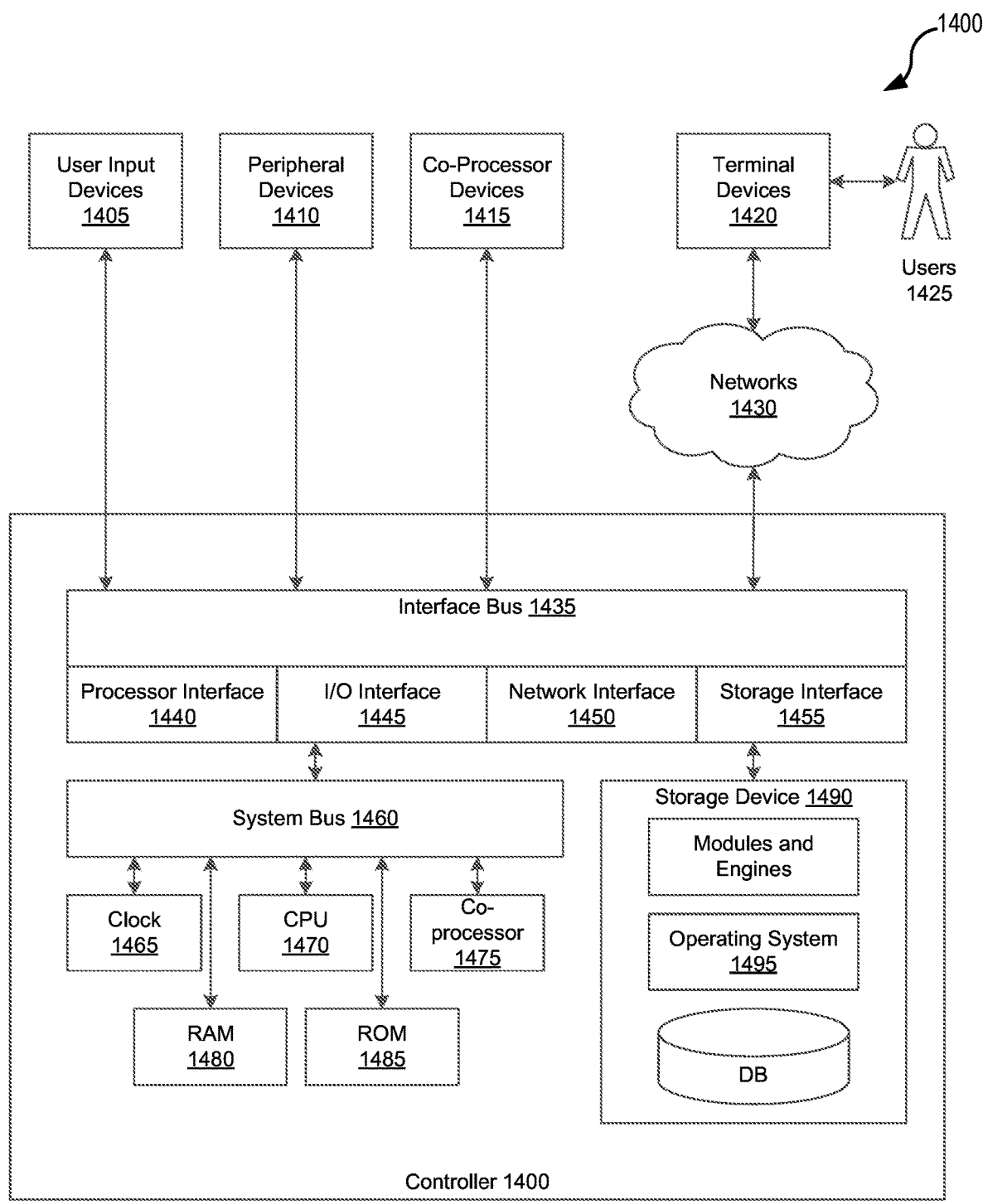
FIG. 14 is a block diagram illustrating an example machine representing the computer systemization of the fire suppression system that can be used in accordance with one or more embodiments of the present technology.

FIG. 14 is a block diagram illustrating an example machine representing the computer systemization of the fire suppression system with remote monitoring that can be used in accordance with one or more embodiments of the present technology. The fire suppression system controller 1400 may be in communication with entities, including one or more users 1425, client/terminal devices 1420 (e.g., devices 110A-110N), user input devices 1405, peripheral devices 1410, optional co-processor device(s) 1415 (e.g., cryptographic processor devices), and networks 1430 (e.g., 120 in FIG. 1). Users may engage with the controller 1400 via terminal devices 1420 over networks 1430.

Computers may employ central processing unit (CPU) or processor to process information. Processors may include programmable general-purpose or special-purpose microprocessors, programmable controllers, application-specific integrated circuits (ASICs), programmable logic devices (PLDs), embedded components, a combination of such devices, and the like. Processors execute program components in response to user- and/or system-generated requests. One or more of these components may be implemented in software, hardware, or both hardware and software. Processors pass instructions (e.g., operational and data instructions) to enable various operations.

The controller 1400 may include clock 1465, CPU 1470, memory such as read-only memory (ROM) 1485 and random access memory (RAM) 1480 and co-processor 1475, among others. These controller components may be connected to a system bus 1460, and through the system bus 1460 to an interface bus 1435. Further, user input devices 1405, peripheral devices 1410, co-processor devices 1415, and the like, may be connected through the interface bus 1435 to the system bus 1460. The interface bus 1435 may be connected to a number of interface adapters, such as processor interface 1440, input/output interfaces (I/O) 1445, network interfaces 1450, storage interfaces 1455, and the like.

Processor interface 1440 may facilitate communication between co-processor devices 1415 and co-processor 1475. In one implementation, processor interface 1440 may expedite encryption and decryption of requests for data. Input/output (I/O) interfaces 1445 facilitate communication between user input devices 1405, peripheral devices 1410, co-processor devices 1415, and/or the like, and components of the controller 1400 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 1450 may be in communication with the network 1430. Through the network 1430, the controller 1400 may be accessible to remote terminal devices 1420. Network interfaces 1450 may use various wired and wireless connection protocols, such as, direct connect, Ethernet, wireless connection such as IEEE 802.11a-x, and the like.

Examples of network 1430 include the Internet, Local Area Network (LAN), Metropolitan Area Network (MAN), a Wide Area Network (WAN), wireless network (e.g., using Wireless Application Protocol (WAP)), a secured custom connection, and the like. The network interfaces 1450 can include a firewall, which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list that details permissions, including, for example, the access and operation rights of an object by an individual, a machine, and/or an application, and the circumstances under which the permission rights stand. Other network security functions performed or included in the functions of the firewall can be, for example, but are not limited to, intrusion prevention, intrusion detection, next-generation firewall, personal firewall, etc., without deviating from the novel art of this disclosure.

Storage interfaces 1455 may be in communication with a number of storage devices, such as storage devices 1490, removable disc devices, and the like. The storage interfaces 1455 may use various connection protocols, such as Serial Advanced Technology Attachment (SATA), IEEE 1394, Ethernet, USB, and the like.

User input devices 1405 and peripheral devices 1410 may be connected to I/O interface 1445 and potentially other interfaces, buses and/or components. User input devices 1405 may include card readers, fingerprint readers, joysticks, keyboards, microphones, mouse, remote controls, retina readers, touch screens, sensors, and/or the like. Peripheral devices 1410 may include antenna, audio devices (e.g., microphone, speakers, etc.), cameras, external processors, communication devices, radio frequency identifiers (RFIDs), scanners, printers, storage devices, transceivers, and/or the like. Co-processor devices 1415 may be connected to the controller 1400 through interface bus 1435, and may include microcontrollers, processors, interfaces or other devices.

Computer executable instructions and data may be stored in memory (e.g., registers, cache memory, random access memory, flash, etc.), which is accessible by processors. These stored instruction codes (e.g., programs) may engage the processor components, motherboard and/or other system components to perform desired operations. The controller 1400 may employ various forms of memory including on-chip CPU memory (e.g., registers), RAM 1480, ROM 1485, and storage devices 1490. Storage devices 1490 may employ any number of tangible, non-transitory storage devices or systems such as fixed or removable magnetic disk drives, an optical drive, solid state memory devices and other processor-readable storage media. Computer-executable instructions stored in the memory may include the monitoring platform 130 having one or more program modules, such as routines, programs, objects, components, data structures, and so on that perform particular tasks or implement particular abstract data types. For example, the memory may contain operating system (OS) component 1495, modules and other components, database tables, and the like. These modules/components may be stored and accessed from the storage devices 1490, including from external storage devices accessible through an interface bus 1435.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data structures, such as an array, hash, list, stack, structured text file (e.g., XML), table, and/or the like. Such data structures may be stored in memory and/or in structured files.

The controller 1400 may be implemented in distributed computing environments, where tasks or modules are performed by remote processing devices, which are linked through a communications network, such as a LAN, Wide Area Network ("WAN"), the Internet, and the like. In a distributed computing environment, program modules or subroutines may be located in both local and remote memory storage devices. Distributed computing may be employed to load-balance and/or aggregate resources for processing. Alternatively, aspects of the controller 1400 may be distributed electronically over the Internet or over other networks (including wireless networks). Those skilled in the relevant art(s) will recognize that portions of the fire suppression system may reside on a server computer, while corresponding portions reside on a client computer. Data structures and transmission of data particular to aspects of the controller 1400 are also encompassed within the scope of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A monitoring platform comprising:
a processor; and
memory including computer-readable instructions that when executed by the processor, cause the processor to:
maintain a database having stored thereon multiple fire suppression profiles, wherein each of the fire suppression profiles correspond to a unique fire suppression system and include a location of the fire suppression system, a list of components of the fire suppression system, and a list of sensors available on the fire suppression system;
execute an identification module to
receive sensor data generated by the fire suppression system;
identify, based on an acoustic signature of the sensor data, an operational status of the fire suppression system after a discharge of gas by filtering the acoustic signature to determine if the acoustic signature corresponds to a test discharge or a non-test discharge based on a change of an amplitude and a frequency of the acoustic signature, the test discharge corresponding to a test and the non-test discharge corresponding to an alarm, the acoustic signature determined to correspond to the alarm responsive to the non-test discharge when the acoustic signature indicates a discharge of both gas and liquid; and
record, within one of the fire suppression profiles in the database, the operational status of the unique fire suppression system over time; and
execute a graphical user interface generation module configured to retrieve, from the database, the operational status from the multiple fire suppression profiles; and
generate the graphical user interface allowing a user to see the operational status of any of the fire suppression profiles.

2. The monitoring platform of claim 1, further comprising instructions to execute an analytics engine to analyze the sensor data and generate a correlation model that predicts a discharge of the fire suppression system.

3. The monitoring platform of claim 2, further comprising instructions to execute a prediction engine to process the sensor data in real-time against the correlation model generated by the analytics engine.

4. The monitoring platform of claim 2, further comprising instructions to execute a prediction engine to process the sensor data in real-time against the correlation model generated by the analytics engine and send a signal to the fire suppression system to automatically cut off a gas line.

5. The monitoring platform of claim 1, further comprising instructions to execute:
a technician locator configured to receive location and schedule updates from mobile devices associated with technicians; and
a service request module configured to identify when the operational status of the fire suppression system is inoperative and identify an available technician using the technician locator.

6. The monitoring platform of claim 1, further comprising instructions to execute a status module and a communications module, wherein the status module uses the communications module to request the operational status of the fire suppression system from one or more gateway units or local processing units.

7. The monitoring platform of claim 1, wherein the graphical user interface includes:
a visualization area to present images or video of parts of the fire suppression system;
a notification area to present notifications regarding the operational status of the fire suppression system or sensor measurements; and
an interactive area allowing the user to select between multiple fire suppression systems, order parts, and take notes regarding the fire suppression system,
wherein any notes recorded by the user are automatically transmitted to the database and stored in one of the multiple fire suppression system profiles.

8. The monitoring platform of claim 1, wherein the graphical user interface includes a visualization area to present a virtual representation of a status of one or more parts of the fire suppression system.

9. The monitoring platform of claim 8, wherein the one or more parts of the fire suppression system included in the virtual representation include an agent tank, a detection line, or a canister.

10. The monitoring platform of claim 1, wherein the fire suppression system includes multiple zones, each zone having one or more nozzles for dispensing fire suppression agent.

11. The monitoring platform of claim 10, wherein the fire suppression profiles in the database identify the multiple zones.

12. The monitoring platform of claim 11, wherein the graphical user interface presents an indication of the operational status of any of the fire suppression profiles includes a map of the multiple zones.

13. The monitoring platform of claim 11, wherein the fire suppression system is associated with a vehicle and each of the multiple zones is associated with an appliance within the vehicle, a wheel well of the vehicle, a storage compartment of the vehicle, a hydraulic system of the vehicle, or a passenger compartment of the vehicle.

14. A non-transitory computer-readable medium having instructions stored thereon that when executed by one or more processors cause a machine to:

receive, from a remote fire suppression system, sensor data representing measurements at one or more locations associated with the remote fire suppression system;
identify, based on an acoustic signature of the sensor data, an operational status of the fire suppression system after a discharge of gas by filtering the acoustic signature to determine if the acoustic signature corresponds to a test discharge or a non-test discharge based on a change of an amplitude and a frequency of the acoustic signature, the test discharge corresponding to a test and the non-test discharge corresponding to an alarm, the acoustic signature determined to correspond to the non-test discharge when the acoustic signature indicates a discharge of both gas and liquid; and
record, within a fire suppression profile in a database, the operational status of the fire suppression system over time; and
wherein the fire suppression profile includes one or more contacts for the fire suppression system;
generate, upon identifying the operational status of the fire suppression system, an alert notifying one or more contacts of the fire suppression profile regarding the identified operational status; and
transmit the alert over a communication channel to a device associated with the one or more contacts based upon transmission information associated with the one or more contacts in the fire suppression profile;
wherein the alert causes a graphical user interface to be displayed on the device indicating the identified operational status.

15. The non-transitory computer-readable medium of claim 14, wherein the instructions when executed further cause the machine to generate, in response to identifying the alarm, a signal that is then transmitted to the fire suppression system to automatically cut off a gas line of an appliance associated with the fire suppression system.

16. The non-transitory computer-readable medium of claim 14, wherein the instructions when executed by the one or more processors further cause the machine to:
receive location and schedule updates from mobile devices associated with technicians; and
select, in response to identifying when the operational status of the fire suppression system is inoperative, an available technician based on location and schedule updates received from the mobile devices associated with the technicians.

17. The non-transitory computer-readable medium of claim 14, wherein the graphical user interface includes:
a visualization area to present images or video of parts of the fire suppression system;
a notification area to present notifications regarding the operational status of the fire suppression system or sensor measurements; and
an interactive area allowing a user to select between multiple fire suppression systems, order parts, and take notes regarding the fire suppression system;
wherein any notes recorded by the user are automatically transmitted to the database and stored in one of the multiple fire suppression system profiles.

18. The non-transitory computer-readable medium of claim 14, wherein the graphical user interface includes a visualization area to present a virtual representation of a status of one or more parts of the fire suppression system.

19. The non-transitory computer-readable medium of claim 18, wherein the one or more parts of the fire suppression system included in the virtual representation include an agent tank, a detection line, or a canister.

20. A method, comprising:
receiving, from a remote fire suppression system, sensor data representing measurements at one or more locations associated with the remote fire suppression system;
identify, based on an acoustic signature of the sensor data, an operational status of the fire suppression system after a discharge of gas by filtering the acoustic signature to determine if the acoustic signature corresponds to a test discharge or a non-test discharge based on a change of an amplitude and a frequency of the acoustic signature, the test discharge corresponding to a test and the non-test discharge corresponding to an alarm, the acoustic signature determined to correspond to the non-test discharge when the acoustic signature indicates a discharge of both gas and liquid; and
generating, upon identifying the operational status of the fire suppression system, an alert indicating the operational status.

21. The method of claim 20, further comprising:
recording, within a fire suppression profile in a database, the operational status of the fire suppression system over time; and
wherein the fire suppression profile includes one or more contacts for the fire suppression system.

22. The method of claim 21, wherein the alert is sent to the one or more contacts within the fire suppression profile.

23. The method of claim 20, wherein in response to identifying the alarm, transmitting a signal to the fire suppression system to automatically cut off a gas line of an appliance associated with the fire suppression system.

24. The method of claim 20, further comprising:
receiving location and schedule updates from mobile devices associated with technicians; and
selecting, in response to identifying when the operational status of the fire suppression system is inoperative, an available technician based location and schedule updates received from the mobile devices associated with the technicians.

* * * * *